(12) United States Patent
Redding, Jr., deceased et al.

(10) Patent No.: US 6,257,527 B1
(45) Date of Patent: Jul. 10, 2001

(54) HYPERSONIC AND ORBITAL VEHICLES SYSTEM

(76) Inventors: Fred Whitney Redding, Jr., deceased, late of Arlington, VA (US); by Mary Redding, executrix, 1701 N. Kent St., Suite 502, Arlington, VA (US) 22209

( * ) Notice: Subject to any disclaimer, the term of this patent is extended or adjusted under 35 U.S.C. 154(b) by 0 days.

(21) Appl. No.: 09/188,308

(22) Filed: Nov. 10, 1998

Related U.S. Application Data

(60) Provisional application No. 60/064,771, filed on Nov. 10, 1997, provisional application No. 60/064,772, filed on Nov. 10, 1997, and provisional application No. 60/064,769, filed on Nov. 10, 1997.

(51) Int. Cl.$^7$ ................................................ B64G 1/12
(52) U.S. Cl. .............................................................. 244/162
(58) Field of Search ................................ 244/2, 160, 162, 244/163

(56) References Cited

U.S. PATENT DOCUMENTS

| | | | |
|---|---|---|---|
| 3,330,510 | * 7/1967 | Johnson | 244/162 X |
| 3,570,789 | * 3/1971 | Rainey | 244/162 X |
| 4,802,639 | 2/1989 | Hardy et al. | 244/2 |
| 4,856,294 | 8/1989 | Scaringe et al. | 2/81 X |
| 5,064,151 | 11/1991 | Cerimele et al. | 244/160 |
| 5,158,248 | 10/1992 | Mockovciak, Jr. | 244/160 |
| 5,255,513 | 10/1993 | Kutschenreuter, Jr. et al. | 60/204 |
| 5,318,256 | 6/1994 | Appleberry | 244/169 |

* cited by examiner

*Primary Examiner*—Robert P. Swiatek

(57) ABSTRACT

A method for developing and utilizing a Space Cruiser vehicle efficiently combines resources from relevant end users in industry and the military. The preferred vehicle has an elongated conical shell with an elliptical transverse cross section. The cabin of the vehicle preferably has a circular transverse cross section, leaving space between the cabin and the shell to store vehicle fuel. The cabin is insulated and capable of supporting occupants in a shirt-sleeve, air-breathing environment whether in the Earth's atmosphere or in outerspace. The vehicle is capable of being launched from conventional aircraft, and also being stored in and launched from a space shuttle or orbiting space station.

16 Claims, 15 Drawing Sheets

1 AIR LAUNCH...GLOBAL...AWAY FROM WEATHER

2 USE C-130J OR L-100-30F 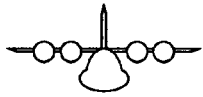

3 ADD PROPULSION MODULE TO COMMERCIAL CRUISER

4 USE COMBINATION OF PROPULSION TYPES
EG:
A/C + STRUT ROCKET + RJ/SJ + STRUT ROCKET + PCE

ROCKET-BASED COMBINED CYCLE ENGINE PROPULSION MODULE

5 EXPLOIT CRUISER'S >> BALLISTIC COEFF. (W/CDA)

6 CANARD CONFIGURATION

7 SUPERSONIC/HYPERSONIC WINGS (NO "DRAGGY" WING)
  -CONTROLLABLE (INLETS INTO AIRSTREAM)
  -JETTISONABLE OPTION

8 SR-71 AS TEST BED FOR X-# A/C 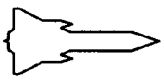

9 X-# SUCESS = X-IS (REUSABLE ORBITAL & TAV)

10 STAGE & RECOVER PROP MODULE (PARAFOIL)

11 MIN PCE ΔV TO ORBIT = MAX ΔV IN SPACE

12 CRUISER + PROP MODULE = ALCV 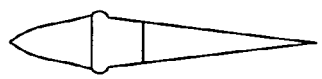

FIG.2

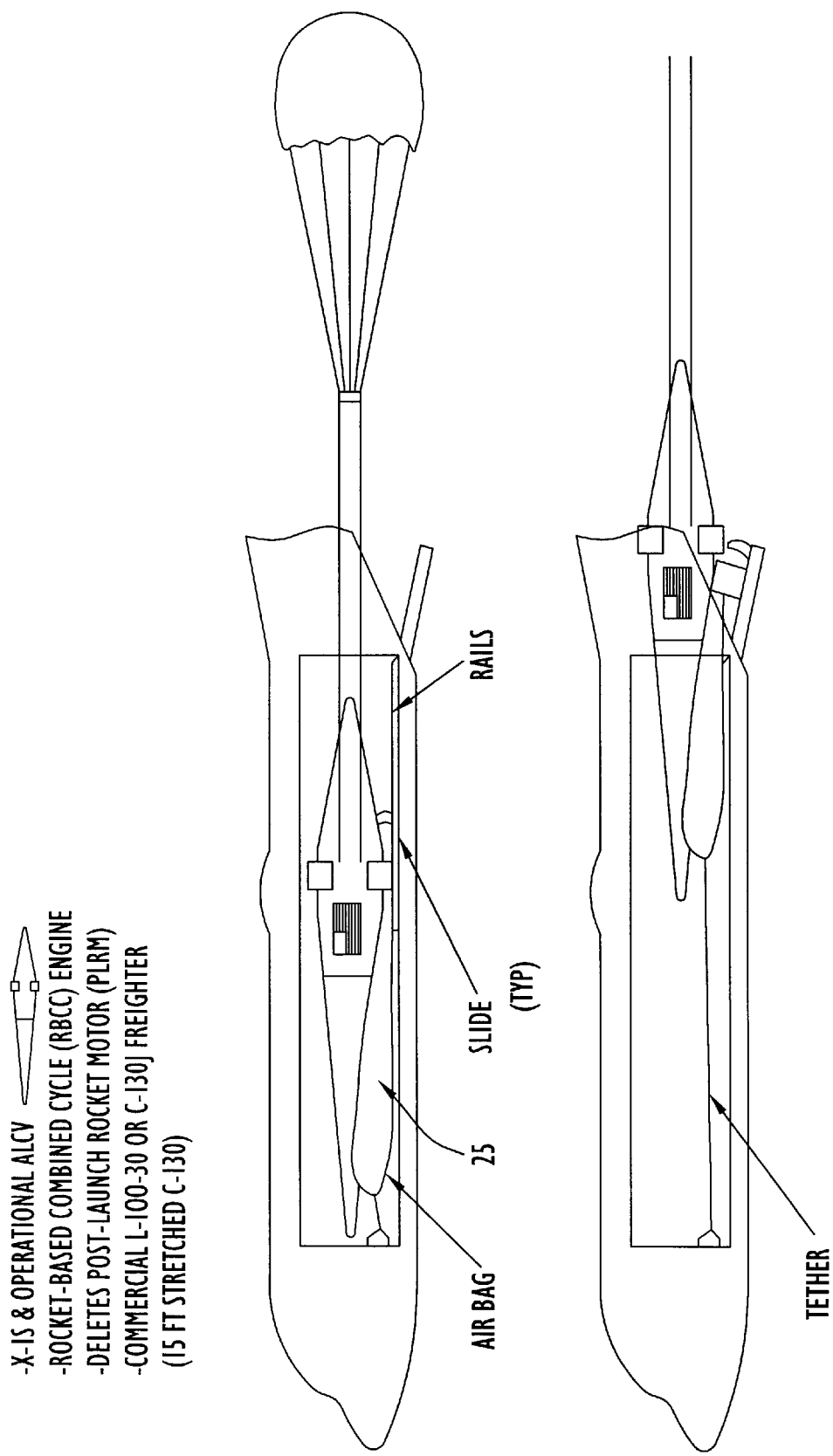

| | CRUISER CONFIGS | PROP | CREW | MAJOR OBJECTIVES | KEY OPTIONS |
|---|---|---|---|---|---|
| PHASE I | -TRUNCATED AND SCALED TO SR-71<br>-CAPTIVE DUMMY | RBCC | UNMANNED | -COMBINED SR-71/X-# PERFORMANCE<br>-AIR-AUGMENTED ROCKET PERFORMANCE<br>-RJ START & OPERATION WHILE CAPTIVE<br>-CRYOGENIC SYSTEM PERFORMANCE<br>-FLIGHT TEST TEAM & EQUIPMENT TUNING | -ABPM TYPES<br>-FUEL (TYP)<br>$LH_2/HC/H_2O_2$ |
| PHASE II | -DEPLOYABLE DUMMY FREE-FLYER WITH RECOVERY SYSTEM | RBCC | UNMANNED | -SEPARATION PERFORMANCE<br>-RJ OPERATION TO M5-M8<br>-CRYOGENIC SYSTEM PERFORMANCE<br>-R/C SYSTEM PERFORMANCE<br>-AERODYNAMICS IN FREE FLIGHT<br>-X-# RECOVERY SYSTEM & OPERATION<br>-SPAVIONICS PERFORMANCE | -ABPM TYPES<br>-GND CONTROL<br>-AIRBORNE CONTROL<br>-VARIABLE GEOMETRY |
| PHASE III | | RBCC | UNMANNED | -RJ/SJ TRANSITION PERFORMANCE<br>-SJ PERFORMANCE<br>-CRYOGENIC PERFORMANCE<br>-X-# RECOVERY FROM HIGH MACH<br>-AIRFRAME/AERO/THERMO PERFORMANCE<br>-SELECT ABPM ENGINEERING & TECH (E&T) | -ABPM TYPES<br>-CONTROL MODES<br>  -GND<br>  -SR-71<br>-AIRFRAME CONFIGS |
| PHASE IV | -MAN-RATED SUBORBITAL<br><br>-SELECTED ABPM | RBCC | MANNED (PILOT) | -LIFE-SUPPORT SYSTEM PERFORMANCE<br>-SPAVIONICS PERFORMANCE<br>-HYPERSONIC PERFORMANCE<br>-X-# PILOT PERFORMANCE<br>-HIGHEST SUBORBITAL VELOCITY<br>-COMMERCIAL-CAPABLE ABPM TECH | -INITIALLY UNMANNED<br>-CONFIG CHANGES<br>-LONG-TERM USAGE PROGRAM WITH SR-71 TEST BED |

X-Is

| | CRUISER CONFIGS | PROP | CREW | MAJOR OBJECTIVES | KEY OPTIONS |
|---|---|---|---|---|---|
| PHASE I | -FULL-SCALE ABPM<br>-FULL SCALE CRUISERS | RBCC | MANNED (PILOT) | -FULL FLIGHT ENVELOPE THRU ORBITAL<br>-L-180-30F/C-130J AS LV<br>-ABPB RECOVERY<br>-X-IS PILOT PERFORMANCE<br>-COMMERCIAL CERTIFICATION<br>-LONG-TERM USAGE | -INITIALLY UNMANNED<br>-TANDEM PILOTS<br>-ABPM RECOVERY<br>-RECOVERY BY STS<br>-TAV FLIGHT<br>-SPACE OPS |
| PHASE II | | RBCC | MANNED (TANDEM) | -FULL FLIGHT ENVELOPE THRU ORBITAL<br>-TANDEM PILOTS & SPECIALIST PERF.<br>-LONG-TERM USAGE<br>-TRANSFORMS TO OPERATIONAL VEH | -SPACE OPS<br>-ETH OPERATIONS |

ABPM = AIRBREATHING PROPULSION MODULE    ETH = EXTERNAL-TANK HANGER  GND = GROUND
HC = HYDROCARBON    R/C = RADIO CONTROL    TAV = TRANSATMOSPHERIC VEHICLE

ΣWp HELD CONSTANT
@ 5800 lbm

| | H₂O₂/JP-5 (90% CONC) | H₂O₂/JP-5 (98% CONC) | COMPARISON N₂O₄/PAAB-1 |
|---|---|---|---|
| MASS MR O/F | 7.1 | 7.7 | |
| $W_{H_2O_2}$ | 5084 | 5133 | |
| $W_{JP-5}$ | 716 | 667 | |
| $V_{H_2O_2}$ | 56.7 | 59.3 | |
| $V_{JP-5}$ | 14.35 | 13.4 | (TOXIC) |
| VR O/F | 3.95 | 4.42 | |
| Σ VOL | 71 FT³ | 72.7 FT³ | |
| $I_{SP}$* | 297 SEC | 308 SEC | 316 SEC |
| Σ ΔV | 8177 FPS | 8482 FPS | 8700 FPS |
| ΔV/ΔV | 94% | 97.5% | 100% |
| $ΔV_{REL}$ | −6% | −2.5% | 0% |

$I_{SP}$* = 93.5% USING STANDARD ONE-DIMENSIONAL
EQUILIBRIUM CALCULATIONS
Q AR = 50:1, Pc = 150psi REF: ABAA 95-2974
NON-TOXIC ON-ORBIT PROPULSION
FOR ADVANCED SPACE VEHICLE APPLICATIONS
CORT/HURLBERT/RICCIO/SANDERS (NASA/JSC)

HYPERSONIC AND ORBITAL VEHICLES SYSTEM

CROSS-REFERENCE TO RELATED APPLICATIONS

This application claims priority from prior U.S. Provisional Patent Applications Ser. Nos. 60/064,771, filed Nov. 10, 1997, 60/064,772, filed Nov. 10, 1997 and 60/064,769, filed Nov. 10, 1997. The entire disclosures in these applications are expressly incorporated herein by this reference.

BACKGROUND OF THE INVENTION

1. Technical Field

The present invention pertains to an air breathing hypersonic propulsion module (ABPM) that, when attached to a manned Space Cruiser vehicle, will revolutionize manned access to orbit in terms of low cost, operational flexibility and responsiveness. The invention also pertains to an effective development program for the ABPM and the Space Cruiser.

2. Discussion of Prior Art

Discussed herein is the following family of related vehicles:

(a) the small, highly maneuverable manned Space Cruiser for commercial, civil and military intraspace and transatmospheric operations such as:
(1) In-space servicing of space assets, (2) Autonomous intraspace and transatmospheric operations, (3) Intraspace transportation and logistics, and (4) Crew addition, exchange, return and rescue.
(b) the X-# aircraft, the X-series hypersonic research and test aircraft which combines a shortened single-seated Space Cruiser (without the Cruiser's rocket engine) with a hypersonic propulsion module that combines an air-augmented rocket mode with ramjet and scramjet modes. The X-# is launched from a SR-71 aircraft, is fully recoverable at helicopter-suitable sites and has the flight-to-flight option to fly unmanned;
(c) the X-1S, the hypersonic, transatmospheric and orbital research and test vehicle which combines the single or tandem-seated Space Cruiser with the reusable air breathing hypersonic propulsion module derived from the X-# aircraft program, is very-low-cost-to-orbit and is launched from a C-130J freighter aircraft.
(d) the Air Launch Cruiser Vehicle (ALCV), the production, operational space vehicle version of the X-1S research vehicle, for commercial, civil and military on-orbit servicing of spacecraft and for other operations in support of national, international and foreign space asset activities. The ALCV combines the single or tandem-seated Space Cruiser with the reusable air breathing hypersonic propulsion module (ABPM) derived from the above X-1S program, is very-low-cost-to-orbit, and is launched from a C-130 derivative L-100-30F or C-130J freighter aircraft;

The present patent application also describes an initial, integrated development and flight test plan for the development, testing and use of the X-# and X-1S vehicles. The development and test program has as primary objectives: (1) To provide the hypersonic and orbital research and test vehicles while saving up to or more than hundreds of millions of dollars relative to the alternative means, and (2) To provide the hypersonic air-breathing propulsion module technology for very-low-cost-to-orbit, aircraft launch of the Space Cruiser for commercial, civil and military space operations. The vehicle system concepts and planning are consistent with national objectives of active participation in appropriate advanced aerospace concepts, technology and development and of supporting synergistically the military, NASA, and the private sector.

The optimal hypersonic propulsion engine for the X-1S and the ALCV is evidenced to be the rocket-based combined-cycle engine (RBCC). The RBCC results in a substantial (appx. 50%) reduction in scramjet maximum speed required to be attained. The X-series program is configured to also provide the modular option for the flight testing of non-RBCC type engines such as ramjet/scramjet and the pure scramjet engines.

In addition to the foregoing manned spacecraft and vehicles present safety concerns that are unique to the space and orbital environment in addition to the concerns in common with aircraft and ground structures and vehicles. The invention disclosed herein addresses the solution of safety concerns for astronauts in spacecraft and space vehicles by means of providing both a sanctuary module or "container" and transportation of the container for the astronauts to a safe place. The safe place can be for example: (1) within the spacecraft (that contains the abnormality or other safety concern) such as a space station or space vehicle, (2) in space after leaving the danger area, (3) in a spacecraft of lifecraft vehicle capable of standing-off from the danger area, and (4) in a spacecraft or lifecraft vehicle capable of transporting the inhabited container to Earth.

BRIEF DESCRIPTION OF THE DRAWINGS

FIG. 2 is a chart listing the properties of the air launch cruiser vehicle (ALCV).

FIG. 7 is a diagram of a method for stowing and deploying the ALCV from commercial aircraft.

FIG. 8 is a chart of research and flight test programs for air launched aircraft and spacecraft.

FIG. 9 is a chart comparing alternative fuel performances.

FOREWORD

This Foreword section provides a brief overview of the Space Cruiser system, its applications and its users, to provide the reader with an initial understanding of the context in which the present invention is placed. The application is generally directed to the development of air launch for the Cruiser system. It emphasizes the development and use of the experimental X-# hypersonic research aircraft and the X-1S hypersonic, transatmospheric and intraspace research vehicle, these being key to both the development of air launch for the Cruiser system and to future hypersonic, transatmospheric and intraspace research and technology development.

Also, after the reader has read the entire patent application, it is suggested that this Foreword section be re-read to provide a much more thorough contextual understanding of the development logic, applications and users of the Cruiser system and the context of air launch.

Figure 1:
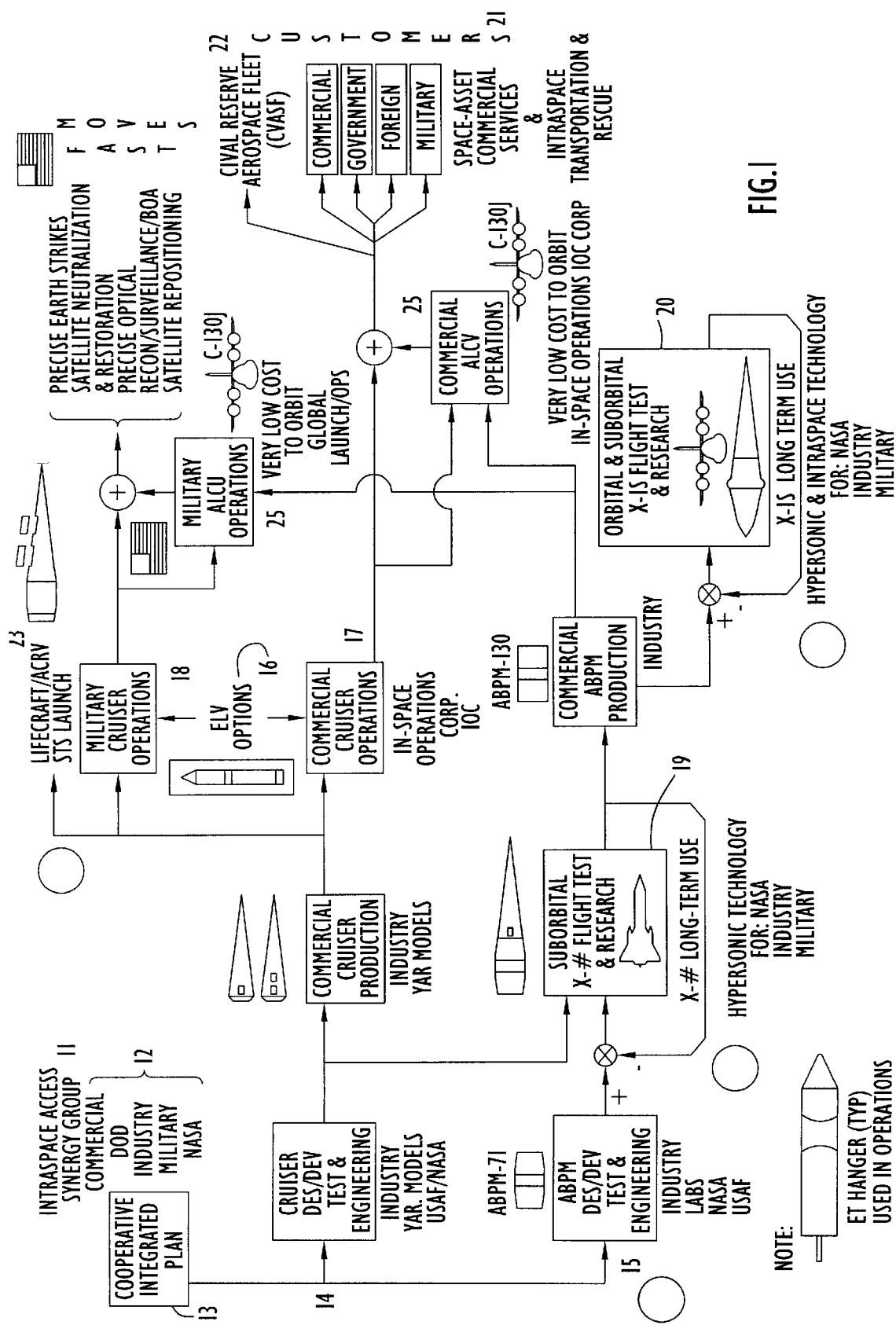
FIG. 1 is a block diagram of the space cruiser vehicle and the air breathing hypersonic propulsion module (ABPM) it employs.

FIG. 1 presents the ABPM system development overview in block diagram format. The presentation begins at the upper left with reference to the Intraspace Access Synergy Group 11 (IASG). Example Group participants 12 are listed. The primary purpose of the Synergy Group is to provide an initial, cooperative, integrated plan for the balance of the Cruiser system development and applications program. The Group is tasked with the criterion of optimally working together, with a minimum of parochialism or proprietary constraints in its development of the Cooperative Integrated Plan.

The Group's work begins with receiving an in-depth presentation and data on what has been accomplished to date in developing the Cruiser system concept, its applications, its users, etc. After IASG discussion each member returns to the member's organization to initially evaluate that organization's potential role, requirements, participation and support with respect to the program. Subsequent IASG meetings synergistically develop and result in the Cooperative Integrated Plan 13 as the key output document.

FIG. 1 then illustrates the development paths, in parallel, of the two main projects, the Space Cruiser 14 and its air breathing propulsion module 15 (ABPM).

As indicated, the Cruiser configurations (models) are to be developed and operated prior to the availability of the ABPM. Expendable launch vehicles 16 (ELV) will be used to launch the Cruisers for both commercial 17 and military missions 18.

Moving down to the ABPM development path in FIG. 1, the first ABPM model, termed the ABPM-71, is configured to be carried and launched by the SR-71 series aircraft and is attached to a truncated Cruiser that does not have the aft cockpit and does not have the Cruiser's plug cluster rocket engine. A low-cost, dummy truncated Cruiser may be used with the ABPM-71 during initial flight tests. The truncated, single seated Cruiser with its ABPM-71 propulsion module is designated herein the X-# 19 experimental hypersonic aircraft.

When the ABPM-71 has been flight-test-proven sufficiently, a larger ABPM-130 is then configured based on the design of the ABPM-71, but improved as a function of the results of the X-# flight tests, that attach to the full-size Cruiser, constituting the X-1S 20 experimental vehicle for hypersonic, transatmospheric and intraspace research and testing. The X-1S is fully capable of orbital and suborbital flight. It is launched from a C-130 stretched (15 feet) freighter aircraft such as the L-100-30F and the new C-130J.

As indicated both the X-# and the X-1S vehicles will be used in long-term flight test programs such as was accomplished with the X-15 program in which the X-15 was launched 199 times. The very large flight envelopes of the X-# 19 and the X-1S 20 vehicles in comparison with the X-15 and the technologies inherent in achieving and using these envelopes equate to the opportunity to accomplish a great deal more with each relative to what was possible with the X-15.

A primary and early objective of the X-1S flight test program is to qualify the ABPM for commercial production and use. When thus qualified the ABPM is then fully available for both commercial and military operations use in the Air Launch Cruiser Vehicle 25 (ALCV) as indicated in FIG. 1. The Cruiser 14 part of the ALCV can be any of the Cruiser models.

The Cruiser 14 can then be launched either by an ELV 16 or air launched, the choice being a function of for example: mission requirements such as the Cruiser's post-launch mission maneuverability requirements and whether or not an ELV 16 is required so that a substantial payload can accompany the launch of the Cruiser 14. In contrast to ELV launch, air launch results in very low cost to orbit, great flexibility with respect to the geographic launch position (e.g., can be global) and launch azimuth, avoidance of weather-induced launch constraints and quick-response launch independent of ELV 16 and ELV launch pad availability.

As FIG. 1 indicates, customers 21 for the commercial Cruiser services include commercial, government (including NASA), foreign customers and the military. Satellites are typically very valuable assets as a result of their return on investment (ROI) or the value of their in-space functions. Servicing these valuable space assets (by, for example: replacing consumables, updating the configuration, repairing the spacecraft or performing combinations of such services) offers valuable service to the spacecraft owner, operator or underwriter and such services constitute the major part of the basis for commercial viability of Cruiser system operations.

FIG. 1 further illustrates that the Space Cruiser commercial fleet can be organized into a Civil Reserve Aerospace Fleet 22 (CRASF) in emergency support of the military, analogous to the vital Civil Reserve Air Fleet (CRAF).

Specific military mission categories are listed and identified as "Fast Moves". These are part of the inventor's Fast Moves concept for military use of the Cruiser system.

At the top of FIG. 1 there is reference to use of the Lifecraft model 23 version of the Cruiser as the Assured Crew Return Vehicle (ACRV) for the International Space Station (ISS) and other space rescue and return operations. The Lifecraft model 23 is the subject of U.S. Provisional patent application Ser. No. 60/064,777, filed Nov. 10, 1997, the entire disclosure of which is expressly incorporated herein. The Lifecraft 23 is capable of returning two persons rapidly to Earth in a "shirt-sleeve" (no spacesuit) environment, with or without a space-suited pilot or other third person in the pilot's seat. To minimize the length of the Orbiter's payload bay used in launching one or more of the Cruiser ACRVs, the Lifecraft 23 can be installed in the payload bay diametrically (cross-axis) with its nose section folded back under its aft section, enabling other payloads to be carried in the bay at the same time.

FIG. 1 further depicts, at the lower left, the use of Space Shuttle External Tanks as in-space hangars 24 for all Space Cruiser users for pre-positioning of Cruiser consumables and equipment and satellite supplies for satellites that are within reach of Cruisers operating with hangar support. In essence, the point is to have logistic and Cruiser hangars in space "where the action is" and to minimize absolutely the need to return to Earth and/or to re-launch in accomplishing missions.

Succinct as it is, FIG. 1 clarifies, as an overall result, the potential for commercial, civil and military cooperative, synergistic, and mutually highly cost-effective development and use of the Space Cruiser system. The Space Cruiser system includes the production Space Cruiser models; the two X vehicles: the X-# 19 aircraft as the world's first hypersonic-flight test bed aircraft; the X-1S 20, the first intra space X-series vehicle and the production, operational Air Launch Cruiser Vehicle 25 (ALCV).

The non-toxic, non-cryogenic propellants hydrogen peroxide and JP-5 are the preferred propellants for the entire Cruiser system (i.e., the X-# aircraft ABPM, the Cruiser and its ABPM in the X-1S space vehicle and both the Cruiser and the ABPM in the operational air launched Cruiser vehicles for commercial, military, etc. use).

DETAILED DESCRIPTION OF THE PREFERRED EMBODIMENTS

I. INTRODUCTION

This invention described below pertains to an air breathing, hypersonic propulsion module 15 with variations which when attached to the aft end of the Space Cruiser 14 (FIG. 1) result in:

(1) a military/NASA air-launched, manned and unmanned hypersonic aircraft for conducting needed research in hypersonic flight technologies for the Government and industry;

(2) a military/NASA air-launched, manned space vehicle for conducting needed research in orbital and transatmospheric flight; and (3) very low cost to orbit, and an otherwise unobtainable degree of operational flexibility and responsiveness for the Space Cruiser 14 in commercial, military and NASA use.

The resulting vehicle family will synergistically benefit aerospace industries, commercial space enterprises, the military, NASA, other Government agencies and those served by these organizations.

Air launch is the preferred launch method described herein for the hypersonic and orbital research vehicles and the private-sector Space Cruiser 14, i.e. for the unified experimental and operational vehicular family. Other launch methods may be used in special circumstances. Other launch method categories for the Space Cruiser family include the Expendable Launch Vehicle (ELV), the Evolved Expendable Launch Vehicle (EELV), the Space Shuttle, the Reusable Launch Vehicle (RLV) and the Transatmospheric Launch Vehicle (TAV).

The military/NASA hypersonic research aircraft vehicle is termed the X-# 19. It is assumed that the X-# 19 would be designated a number as an X-series vehicle. The military/NASA manned all-envelope, hypersonic, intraspace and transatmospheric research space vehicle is termed the X-1S 20, signifying that it would be the first X-series vehicle capable of intra space flight research. The production operational air launched vehicle is termed herein the Air Launch Cruiser Vehicle 25 (ALCV) and is basically the same as the X-1S 20 vehicle.

A. Military/NASA X-Series (X-#) Hypersonic Research Aircraft Vehicle

The X-# 19 hypersonic research vehicle is launched from the top of a SR-71 series aircraft. The vehicle consists of a single place, Cruiser-derived (truncated) airframe and Cruiser subsystems plus an air breathing propulsion module 15 (ABPM) which is attached to its aft end. The Cruiser's plug-cluster rocket engine (PCE) is deleted. The propulsion module is basically a propellant tank and a rocket-based combined-cycle (RBCC) engine that includes internal rocket modes (cycles) and air breathing ramjet and scramjet modes. Whereas the propulsion module attaches like a stage, an ABPM configuration using an integrated ramjet/scramjet engine (without the rocket modes) may for example also be used in the test program. It is planned that the ABPM would be developed primarily by military/NASA. It is designated specifically herein as the ABPM-71.

The rocket and ramjet modes of the RBCC engine can be started and checked out prior to launch, while the X-# 19 remains captive on top of the SR-71, as was done with the ramjet of the Lockheed forty-two foot 11,200 pound D-21 drone at altitudes of about 80,000 feet, at speeds of about Mach 3.2. The X-# 19 is fully recoverable and, with the possible exception of thermally damaged components, is fully reusable. The X-# 19, the X-1S 20 and the commercial ALCV 25 do not require runways. Because they land under a controllable parafoil 26, they only require helicopter-suitable landing sites.

An inexpensive, dummy Cruiser is used during initial, unmanned X-# flight tests while the Cruiser is being developed and phased into the X-# 19 flight test program. The X-# 19 hypersonic research vehicle can then be flown unmanned or manned.

B. Military/NASA X-1S Space Vehicle

The X-1S 20 hypersonic and orbital research vehicle comprises a Space Cruiser 14 and an ABPM 15. It is launched by extraction from the payload bay of a stretched C-130 derivative, C-130J freighter aircraft. The specific configuration of the RBCC ABPM for the X-1S 20 is selected from and is a larger version of the flight tested X-# ABPM-71 and is designated herein as the ABPM-130. After deployment from the subsonic C-130J launch aircraft, the X-1S 20 accelerates to ramjet operational speed. The air-augmented rocket mode of the RBCC engine provides the acceleration to the supersonic ramjet operational speed range.

Note that if an alternative, non-RBCC, ramjet/scramjet ABPM is mechanized, a post-launch rocket motor (PLRM) must be added to the aft end of the ABPM to provide the acceleration of the vehicle from the subsonic aircraft launch speed to the supersonic ramjet engine-start speed.

C. Air Launch Cruiser Vehicle (ALCV)

The freighter-launched ALCV 25 space vehicle comprises a Space Cruiser 14 and the ABPM-130 which results from the integrated X-# and X-1S programs. All Space Cruiser 14 models can be air launched as an ALCV 25.

The basic Cruiser models are: (1) Single-seated (aft) Cruiser (8700 fps); (2) Two-seated, tandem Cruiser (7200 fps); (3) Lifecraft Cruiser for shirt-sleeve in-space transport or return to Earth of up to two astronauts, with or without a space-suited astronaut; (4) Single-seated (forward) Cruiser freighter; and (5) Single-seated (forward) high performance Cruiser (>13,000 fps).

D. Commercial/Military/NASA Program Synergisms

Commercial acquisition and operation of the Space Cruiser 14 provide private-sector missions such as in-space servicing of space assets, hazard removal, logistics, tugging and crew transportation and rescue. The commercial operations serve domestic, foreign and international customers.

The commercial services will be readily available to the military and other Government organizations. In pertinent times of national emergency the commercial fleet will be available in the context of today's Civil Reserve Air Fleet (CRAF), thereby transforming the CRAF to a Civil Reserve Aerospace Fleet 22 (CRASF).

Military/NASA will, after initial X-# flight tests with a dummy Cruiser, first acquire the single-seated, shortened Cruiser, which is truncated specifically to reduce its cross sectional area for its use in the SR-71 launched X-# 19 hypersonic research aircraft. Subsequently the full size commercial Cruiser 14 will be acquired for its use in the X-1S 20 hypersonic and intra space research vehicle. Commercial ABPM production and use will result from the military/NASA testing of the ABPM 15 (s). Therefore one of the synergisms between the Government and the private sector is that the X-1S 20 vehicle's flight-proven ABPM will go into production for both the private and the Government sectors. Similarly the production Space Cruiser 14 will be acquired by the military/NASA for both the X vehicles and for military/NASA operational ALCV 25 use.

As a result of this cooperative and synergistic separation of operations, military/NASA and the private sector will cooperatively fund the flight test of the Space Cruiser 14. Because the ABPMs attach like stages to the aft end of the Cruiser 14, two or more such types of ABPMs can be exchanged between flights during the flight test programs if the system were so configured. Therefore larger spectra of hypersonic technologies can be flight tested.

Overall results of the synergisms include: (1) obtaining the most useful and flexible and lowest cost hypersonic test aircraft, the SR-71 launched, air-breathing X-# aircraft, for vital hypersonic research and development for military/NASA and industry; (2) obtaining the most useful and flexible and lowest cost air-breathing hypersonic propulsion system for both the manned military/NASA X-1S 20 space vehicle for space research and development to, in and from space; and (3) obtaining the air-breathing hypersonic propulsion system for very low cost to orbit for the production, operational ALCV 25 air launched Space Cruiser for commercial and military/NASA use.

The Space Cruiser of the present invention is designed primarily to provide highly maneuverable space transportation and in-space support for one or two persons. It is not designed to be a launch vehicle; however it is clear that the freighter model has the potential to carry a small spacecraft to orbit. In this sense it is not a launch vehicle and does not compete with launch vehicles. Instead, it carries one or two astronauts, their tools, spacecraft components and consumables to space for in-space servicing of satellites and space vehicles and performs a variety of other tasks and missions. Indeed, the Cruiser and its uses are highly synergistic with launch vehicles and their payloads. Furthermore some missions, for example high orbit missions, will either require the launching of the Cruiser on an ELV or RLV, or the coordinated launch of such a launch vehicle in logistic support of the air launched Cruiser's mission.

The term "space transportation" is now commonly but narrowly used to denote launch vehicle systems. "Space transportation" as used herein, in accordance with decades of its use, is expanded specifically to also include manned vehicles that maneuver in outer space from point to point, and to and from objects, analogous to automobiles, trucks, helicopters, aircraft, etc. in, on or above ground. NASA's Space Transportation System (STS) or "Shuttle", while limited severely in its intraspace maneuverability, is such a space transportation system. Apollo was a space transportation system. The present invention recognizes the need for and the large benefits that will result from a manned space vehicle system that includes the capability for substantial in-space and synergetic plane change maneuverability, especially because the cost-to-orbit is very low.

Small vehicular size, the use of supersonic and hypersonic air breathing propulsion, reusability and aircraft launch are combined herein to obtain a closely knit family of research and operational vehicles that will benefit synergistically the military, the NASA and other Government agencies and the private sector in hypersonic flight, space transportation, in-space servicing and other operations in and from space.

The costs of the cooperative development and test of the Space Cruiser 14 and its propulsion modules are suggested to be distributed appropriately among the private sector, NASA, DoD and other Government agencies because of their synergistic organizational needs for the Cruiser system and/or its capabilities.

Table 1 presents a vehicle comparison summary to further indicate differences, similarities and other characterizing functions among the X-# 19, the X-1S 20 and the ALCV 25 configurations. Some of the comparisons are clarified and expanded below.

TABLE 1

VEHICLE COMPARISON SUMMARY

|  | X-# | X-1S | ALCV | NOTES |
|---|---|---|---|---|
| 1 REUSABLE | YES | YES | YES | PARAFOIL LANDING |
| 2 COMMERCIAL MISSION USE | NO | NO | YES | SPACE SERVICING, ETC. |
| 3 MILITARY MISSION USE | NO | OPTION | YES | INTRA SPACE & TAV, ETC. |
| 4 FULL FLIGHT ENVELOPE | NO | YES | YES | YES INCLUDES ORBITAL |
| 5 COMMERCIAL PRODUCTION | NO | OPTION | YES | ALCV APPX = X-1S |
| 6 FUNDING | GOVT | COOPTV | COMM | REFUND X-1S? |
| 7 SCRAMJET VERY HIGH MACH # | NO | NO | NO | IF USE RBCC |
| TO SUCCEED | NO | YES | YES | IF NON-RBCC |
| 8 HYPERSONIC FLIGHT | YES | YES | YES | IN THE ENVELOPE |
| 9 SUBORBITAL FLT CAPABLE | YES | YES | YES |  |
| 10 ORBITAL-FLIGHT CAPABLE | NO | YES | YES |  |
| 11 TRANSATMOSPHERIC (TAV) | NO | YES | YES | YES = PILOT'S OPTION |
| 12 RECOVERY TESTS/OPERATIONS | YES | YES | YES |  |
| 13 REENTRY TESTS/OPERATIONS | YES | YES | YES | X-# LIMITED AS SUBORBITAL |

TABLE 1-continued

VEHICLE COMPARISON SUMMARY

| | X-# | X-1S | ALCV | NOTES |
|---|---|---|---|---|
| 14 SPAVIONICS TESTS/OPS<br>-AUTOPILOT<br>-GUIDANCE & NAVIGATION<br>-COMMUNICATIONS<br>-COMPUTER<br>-DISPLAYS<br>-LIFE SUPPORT SYSTEM<br>-FLIGHT TEST INSTRUM'N | YES | YES | YES | X-# BAREBONES<br>& WITH DUMMY CRUISER |
| 15 AEROSHELL CONFG TEST/MOD | YES | YES | YES | AEROSHELL REMOVABLE/REPLACEABLE |
| 16 MULTIPLE MEANS OF DATA RECORDING & TRANSMITTING | YES | YES | YES | X-#/X-1S/ALCV |
| 17 LONG-TERM USAGE OPTIONS | YES | YES | YES | |
| 18 MODULAR<br>-PROPULSION MODULES<br>FOR TYPES/MODELS OF<br>HYPERSONIC PROPULSION<br>-AEROSHELL OPTIONS<br>-DUMMY CRUISER AT FIRST<br>COCKPIT & LSS LATER<br>SYSTEM | YES | YES | YES | PROP MODULE ATTACHES LIKE STAGE<br><br>SHELL HOLSTER OVER CONE STRUCT.<br>YES ON X-#, OPTION ON X-1s,<br>LSS = LIFE SUPPORT |
| 19 LAUNCH VEHICLE | SR-71 | C-130 deriv | C-130 deriv | CAN USE OTHER FREIGHTERS |
| 20 ORBITER LAUNCH VEH OPTION ORBITER | NO | YES | YES | ALSO CAN RETURN IN |
| 21 USE HYDROGEN PEROXIDE & FUEL HYDROCARBON PROPELLANT SUCH AS JP-5 | YES | YES | YES | RBCC FOR SAFETY WITH<br><br>& OPS ADVANTAGES |

NOTES:
RBCC = Rocket-Based Combined Cycle engine such as the Aerojet Strutjet C-130 = C-130 derivative such as the L-100-30 or the C-130J The ALCV (Air Launch Cruiser Vehicle) is basically a flight tested X-1S
Spavionics = Integrated avionics/space avionics
The X-#, X-1S and ALCV Cruiser airframes are soft-tooled non-metallic

II. TECHNICAL DISCUSSION

This section first addresses briefly the private sector Air Launch Cruiser Vehicle (ALCV 25) concept, through its motivation, conceptual design configuration and its expected performance with emphasis upon the need for obtaining low cost to orbit and other real advantages from air launch. Then section then defines and discusses the "X" series (X-# 19) experimental hypersonic aircraft which is basically a shortened (truncated) Space Cruiser to which a rocket-based combined-cycle air breathing propulsion module (ABPM 15) has been attached. The X-# 19 aircraft will be launched from the top of a SR-71 for hypersonic vehicular research. The X-# 19 vehicle will also result in the completion of the RBC propulsion technology and other hypersonic technologies for both the subsequent full-size experimental space vehicle defined and presented herein as the X-1S 20 and the private-sector commercial ALCV 25.

The resultant ABPM technology from the X-# program is then applied in combination with the full-size Space Cruiser 14 to constitute the X-1S 20 experimental aircraft/ spacecraft. The X-1S 20 vehicle is viewed as the first X-series intraspace research vehicle. Its flight test program will serve military/NASA and the private sector. It will enable the private-sector use of its ABPM 15 which when combined with the Space Cruiser 14 forms the private-sector ALCV 25 for low cost and highly flexible launch to its commercial operations in space. Acquisition of ALCVs 25 by the military will enable a full set of intraspace and transpace missions not possible previously.

Commercial Air-Launch Concept Motivation

The key motivations which precipitated and justify the ALCV 25 concept for commercial use are: (a) to obtain the benefits of a large reduction in the cost of launch relative to launch by any expendable launch vehicle (ELV), and (b) to obtain the benefits of aircraft flexibility in terms of launch location, weather avoidance and obviation of launch site conflicts, relative to both the ground-launched expendable launch vehicles (ELV) and the future ground-launched reusable launch vehicles (RLV). Air launch is attained with speed, geographically (global) and above or otherwise away from the weather. Such benefits include increasing dramatically the cost-effectiveness of missions and tasks such as: (1) on-orbit spacecraft servicing such as refueling, maintenance, inspection, checkout, repairs, updating, component retrieval, and spacecraft decommissioning; (2) crew transportation and rescue; (3) utility tasks such as hazard removal and tug services; and (4) Cruiser-payload support.

Key benefits to the commercialization of space include: providing on-orbit services (as above) that are otherwise unobtainable or unaffordable; increasing business volume, frequency and types of projects; reducing spacecraft operating costs, insurance/underwriting costs and sparing costs; and providing highly flexible, responsive and launch-on-need support of space assets. The benefits accrue to spacecraft developers, owners, insurers and users and to the Cruiser operator who provides the services as a commercial business.

A. Principles of the Air Launch Cruiser Vehicle Concept

The following principles characterize the ALCV 25 concept and are summarized in the chart of FIG. 2:

1. A C-130 derivative aircraft is used, such as the commercial L-100-30 Hercules Airfreighter or the new C-130J of the Lockheed Aeronautical Systems Company (LASC).

2. The ALCV 25 and X-1S 20 vehicles concepts are not limited to being launched by a specific type aircraft. The implications of other aircraft will be evaluated.

3. An optimized combination of propulsion systems is used in the ALCV 25 for improved efficiency and cost-effectiveness.

4. A propulsion module (PM) is added to the aft end of the Cruiser 14. The Cruiser's nose radius is decreased to optimize airflow over the Cruiser 14 up to the engine inlets. Other aerodynamic control changes may be required.

5. Several types of PM's may be used. They are:
   (a) The rocket-based combined cycle (RBCC) engine (described by Siebenhaar et al in "Strutjet Powered Reusable Launch Vehicles", Sixth Annual Propulsion Symposium, September 1994) propulsion module, termed herein the RBCC ABPM, which is an internally combined and integrated rocket and airbreathing ramjet/scramjet propulsion system;
   (b) The combination of a separate and, after ramjet operation speed is reached, separable, post-launch rocket motor (PLRM) and an airbreathing ramjet/scramjet engine propulsion module (ABPM 15);
   (c) The combination of a PLRM and a pure scramjet (no ramjet); and
   (d) The combination of a PLRM and an RBCC ABPM.

6. The RBCC ABPM (example (5a) above) is the optimal PM for the ALCV 25 because it deletes the PLRM and its associated problems such as the resulting large aftward shift of the vehicle's center of gravity and the risks associated with the PLRM falling to earth after being staged. In terms of performance risk the RBCC's integral post-scramjet rocket mode minimizes the dependence upon achieving high vehicular hypersonic speed from the scramjet operation mode. The RBCC has the highest effective specific impulse. Of course, one or more of the other types of PMs may also be flight tested in additional ABPMs in the experimental vehicles if desired.

7. Ramjet/scramjet (RJ/SJ) engine mode start can occur at several Mach numbers lower velocity than with a pure scramjet. Thus the PLRM is much smaller and results in a considerably lower weight ALCV 25, offering significant benefits in terms of launch aircraft center of gravity maintenance, during deployment from the aircraft, and during handling of the ALCV 25 on the ground while loading the aircraft.

8. If a PLRM were used, after rocket thrust termination, whether by command or by propellant depletion, the PLRM is staged. A solid propellant type rocket motor is assumed herein as the PLRM. However subsequent analysis may indicate a throttleable hybrid or other type rocket motor be used at least in some experimental configurations.

9. In launch-to-orbit flight profiles with the X-1S 20 and the ALCV 25 the ABPM 15 is staged at a high suborbital speed sufficient to enable the Cruiser's plug-cluster rocket engine (PCE) to propel the Cruiser 14 to orbit and have sufficient propellant to complete its mission in space and to land. An advantage of the RBCC type of ABPM 15 is that transition from the scramjet mode 29 to the rocket mode 30 provides vehicle acceleration to flight velocities well beyond those possible with the scramjet mode 29. This also reduces significantly the risk and cost associated with requiring and developing very high scramjet speed operation.

10. The staged ABPM 15 of the ALCV 25 and of the X-1S 20 experimental vehicle is recovered by a parachute system comprising a drogue and multiple-reefed, controllable parafoil 26, as is done with the Space Cruiser 14 itself for landing. The X-# 19 aircraft with its ABPM 15 attached is also recovered by drogue and parafoil 26. Runways are not required. Helicopter-suitable landing sites are sufficient.

11. A high density-impulse propellant combination is used, such as high concentration (90%–98%) hydrogen peroxide as the oxidizer and hydrocarbon fuel such as JP-5.

12. The very high ballistic coefficient ($W/(C_D A)$) of the Cruiser 14 vehicle is exploited, with and without the ABPM 15 attached. The launch envelope may be increased substantially relative to the lower ballistic coefficient vehicle configurations such as vehicles winged for landing and axi-symmetric vehicles with lower slenderness ratios. Lower flight altitude and lower post-launch flight path angles during airbreathing flight can be used. The larger allowable flight envelope may benefit and ease airbreathing engine requirements and operation over a spectrum of missions and Cruiser propellant loadings. Velocity losses due to gravity ($V_G$) would trade off against drag velocity losses ($V_D$).

13. The "draggy" wing of other hypersonic flight vehicles is obviated. The air-launched Cruiser 14 does not require a wing for takeoff or landing. It uses a deployable, controllable parafoil 26 when landing. Its body-only hypersonic L/D ratio with viscous effects included exceeds that of the winged vehicles and its drag coefficient is considerably lower. Substantially smaller wings in the canard configuration are used after launch for a period into the hypersonic flight region. These four independently rotatable forward and aft wings in the canard configuration permit ascent while at close to airframe zero angle of attack, thereby obviating airframe obscuration of the engine inlets. They may be jettisoned at some point in the profile to eliminate wing weight and drag and any undesired effect upon the operating of the airbreathing engine. The approach or ground rule here is to maximize L/D while minimizing drag. During portions of launch and transatmospheric and recovery flight the vehicle does not always fly at or near maximum L/D. Therefore the ALCV 25 benefits significantly from its very low drag configuration during substantial phases of its atmospheric flight profile.

14. Consumption of the Cruiser's PCE propellants is minimized in reaching LEO subsequent to ABPM 15 staging resulting in greater $\Delta V$ availability in space and higher safety through larger maneuverability in space and during landing site selection. While gliding with the parafoil 26, unused propellant can be used for powered flight at "ultralight aircraft" speeds while selecting a touchdown site.

15. One (or two) SR-71 fleet aircraft may be used as the initial test bed(s) for the ALCV 25 through their carrying and launching of the X-# hypersonic aircraft at speeds up to and above Mach 3.0. For example, both the air-augmented rocket and the ramjet modes of the RBCC can be operated while the X-# 19 vehicle is captive on the SR-71. The X-# 19 aircraft is much lighter and smaller than the D-21 drones that were carried and launched from the SR-71. Of particular importance is the smallness of the X-# 19 aircraft wingspan in comparison with the drone.

16. The X-# 19 aircraft flight test program transitions into that of the X-1S space vehicle. The X-1S 20 serves as the principal flight test vehicle for the commercial ALCV 25. Both the X-# 19 and the X-1S 20 will provide long-term flight test capability for a wide variety of technologies and vehicles in addition to the ALCV 25.

B. SR-71 Launch of the X-# Hypersonic Research Aircraft

The X-# 19 hypersonic aircraft can be carried by the SR-71 and launched and flown manned or unmanned. To reduce the drag presented by the X-# 19 aircraft in the performance of the SR-71/X-# aircraft system, the Space Cruiser derived airframe is truncated aft of the forward seat for use with the SR-71. The result is the vehicular maximum cross-sectional area of between 25 and 30 square feet. The vehicle body is shortened by eliminating the aft cockpit and the PCE rocket engine system. The attitude control, Reaction Control System (RCS) is also deleted.

Launching a non-RBCC powered X-# 19 aircraft from the SR-71 obviates the post-launch rocket motor (PLRM) which is required with freighter subsonic aircraft launch of the non-RBCC X-#. Any X-# aircraft's ramjet mode 28 can be started and operated in flight tests at speeds up to and perhaps greater than Mach 3.0 while the X-# 19 remains attached to the SR-71. When the ramjet system has been verified to such speeds the X-# can be deployed and tested through the full ramjet operating speed range. Then ramjet/scramjet transition and scramjet operation can be tested and refined. If the RBCC configuration is used, the air-augmented rocket mode 30 can be operated while the aircraft is captive on the SR-71 and can be used during deployment from the SR-71.

A dummy truncated Cruiser section that eliminates the aft cockpit can be used until the aft-attached propulsion module and the flight test operations are proven sufficiently to allow the pilotable Cruiser-derived truncated section to be used. When configured for piloting, the truncated X-# 19 can be operated unmanned or manned with one crewmember.

Figure 3:
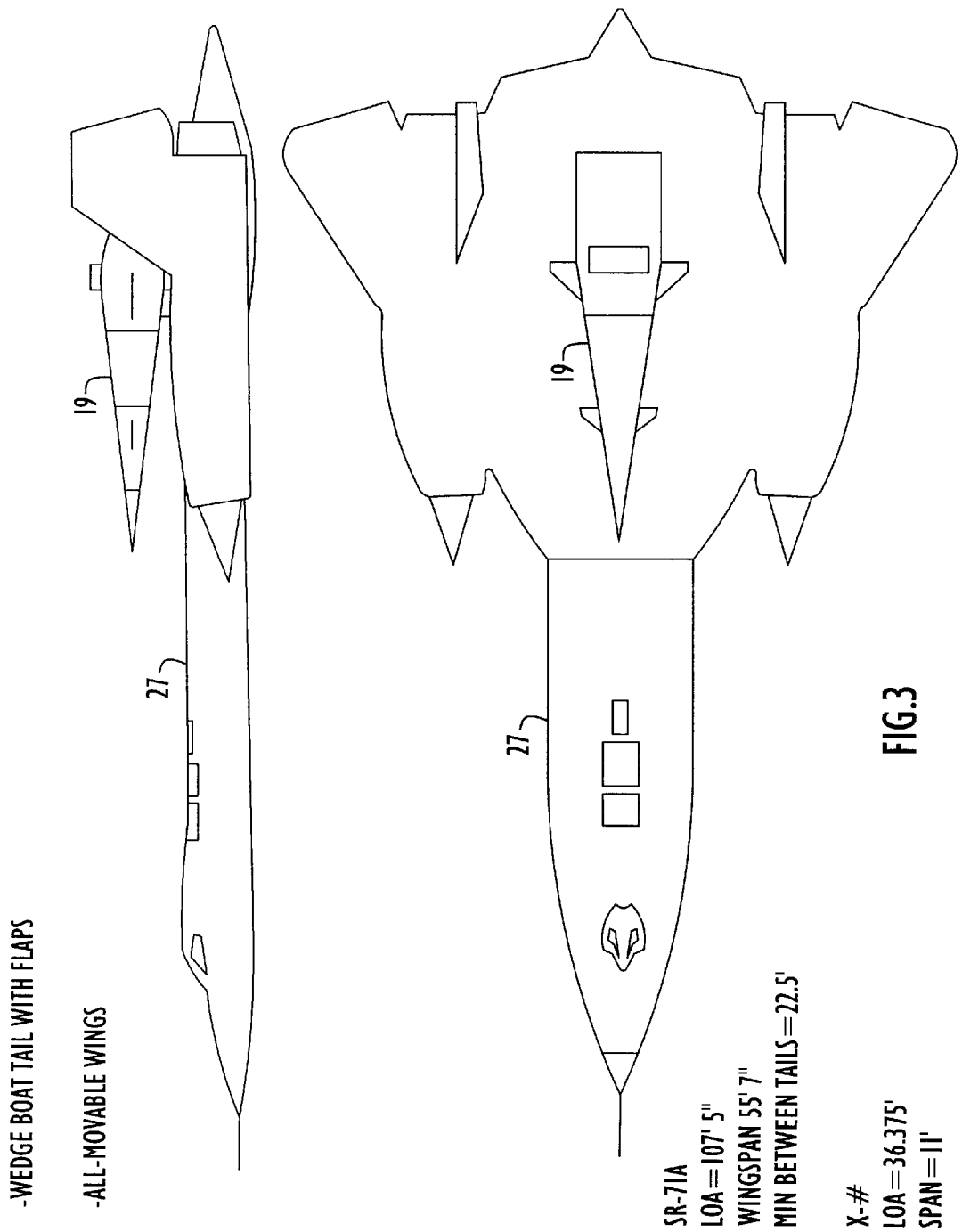
FIG. 3 is an illustration of a SR-71 aircraft carrying an X-# aircraft for launch.

FIG. 3 shows the X-# 19 aircraft mounted on a pylon on top of the SR-71 as was done with the operational supersonic D-21 ramjet-powered drones that were launched at an altitude of over 80,000 feet at speeds of about Mach 3.2. The D (Daughter)-21 drone had an overall length of over 42 feet. Its Delta wing had a wingspan of over 19 feet and it weighed 11,200 pounds (wet).

The Lockheed Advanced Development Company analyzed mounting a hypersonic drone on a YF-12C aircraft for launch at cruise altitude and Mach. The drone was to have a length of 50 feet, with a total (fueled) weight of 14,800 pounds. A 115-inch tail cone fairing was added to decrease drag during mated flight. A canoe with a 5 by 7-inch cross-section was added along the bottom centerline of the drone to accommodate launch attachments and landing provisions. Aerodynamic lift was determined to be the most appropriate means of drone separation from the aircraft. The study concluded that installation and launch of the specified drone was feasible. Nitrous oxide engine injection and using increased exhaust gas temperatures are two thrust enhancement means in the SR-71 for use (if desired) through its Mach 1 transition phase.

The X-# 19 aircraft configuration in FIG. 3 has the cone-elliptic Cruiser-derived truncated forward section and a jettisonable, wedge-shaped, boat tail aft end. It has small jettisonable wings for use during the initial flight regime from launch into supersonic/hypersonic flight. Both the forward and aft wings of this canard configuration are controllable, providing both pitch and roll aerodynamic control. This canard control configuration provides the capability to perform the acceleration climb while the longitudinal x-axis of the aircraft is controlled to maintain the engine air inlets optimally facing the airstream, close to horizontal. Therefore the upper engine intakes undergo minimum occlusion by the X-# fuselage forebody that would otherwise occur during positive pitch attitudes corresponding to the need for body lift during the climb. In the same manner the aircraft can descend while maintaining the engine intakes directed optimally into the airstream.

The rotatable wings also provide an extra measure of separation control during the separation and deployment of the X-# 19 aircraft from the SR-71 launch platform.

C. Hypersonic research and Testing with the X-#

The X-# 19 aircraft launched from the SR-71 27 is a reusable experimental aircraft. The X-# 19 launched from a subsonic aircraft such as a freighter, B-52 or other aircraft is also reusable if the RBCC propulsion system is used. It would be launched with its air-augmented rocket mode operating. With other propulsion systems such as the ramjet/scramjet system a post-launch rocket motor (PLRM) would be required to boost the aircraft to ramjet initial operating speed of approximately Mach 2.

Figure 4:
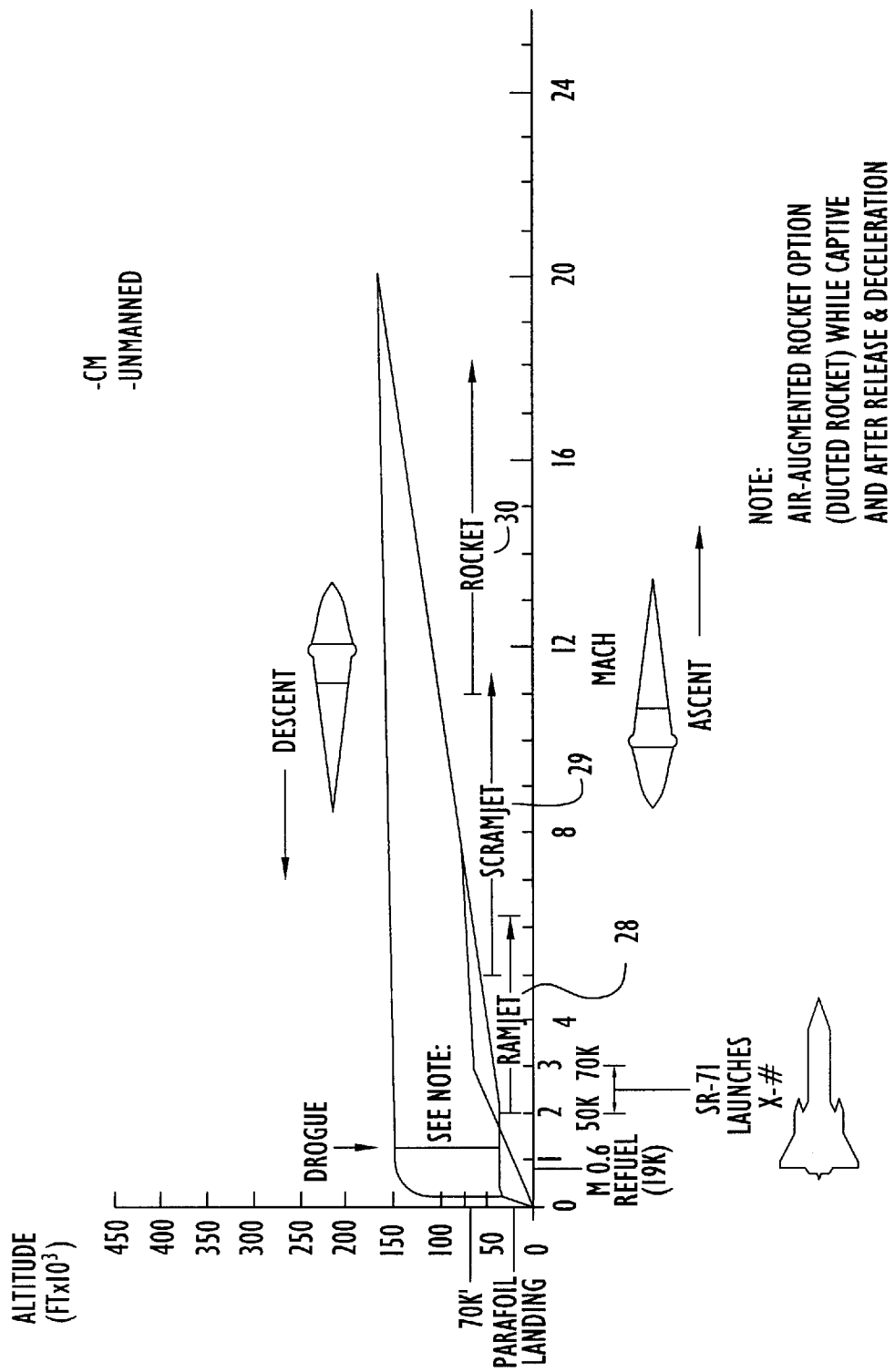
FIG. 4 is a graph of the flight envelope experienced by the SR-71 aircraft when launching a X-# aircraft.

FIG. 4 illustrates a representative combined system flight envelope using the SR-71 27 as the launch platform and using the RBCC propulsion system. The SR-71 27 flight path rises from the origin in the altitude vs. Mach number graph along an approximately straight line. At an altitude of 19,000 feet the SR-71 27 is refueled by a tanker. When the SR-71 27 reaches the launch speed shown in the range between Mach 2 and Mach 3, corresponding to an altitude between 50,000 and 70,000 feet respectively, the ramjet is started while the X-# 19 is captive on the SR-71 27. When the ramjet operation is verified, the X-# 19 aircraft is deployed. The X-# 19 aircraft accelerates and climbs along path represented by the lower curve in FIG. 4. At any point along the curve the vehicle can be throttled back to a constant speed or decelerated (i.e., into the interior of the envelope). The aircraft can be transitioned between ramjet 28 and scramjet operation modes while accelerating or decelerating if the engine can operate in that manner. Transition from the scramjet mode 29 to the rocket mode 30 is also shown. As noted, the RBCC engine can also be started and operated in an air-augmented rocket mode while captive on the SR-71 27 and deployed in that mode prior to ramjet start.

Figure 5:
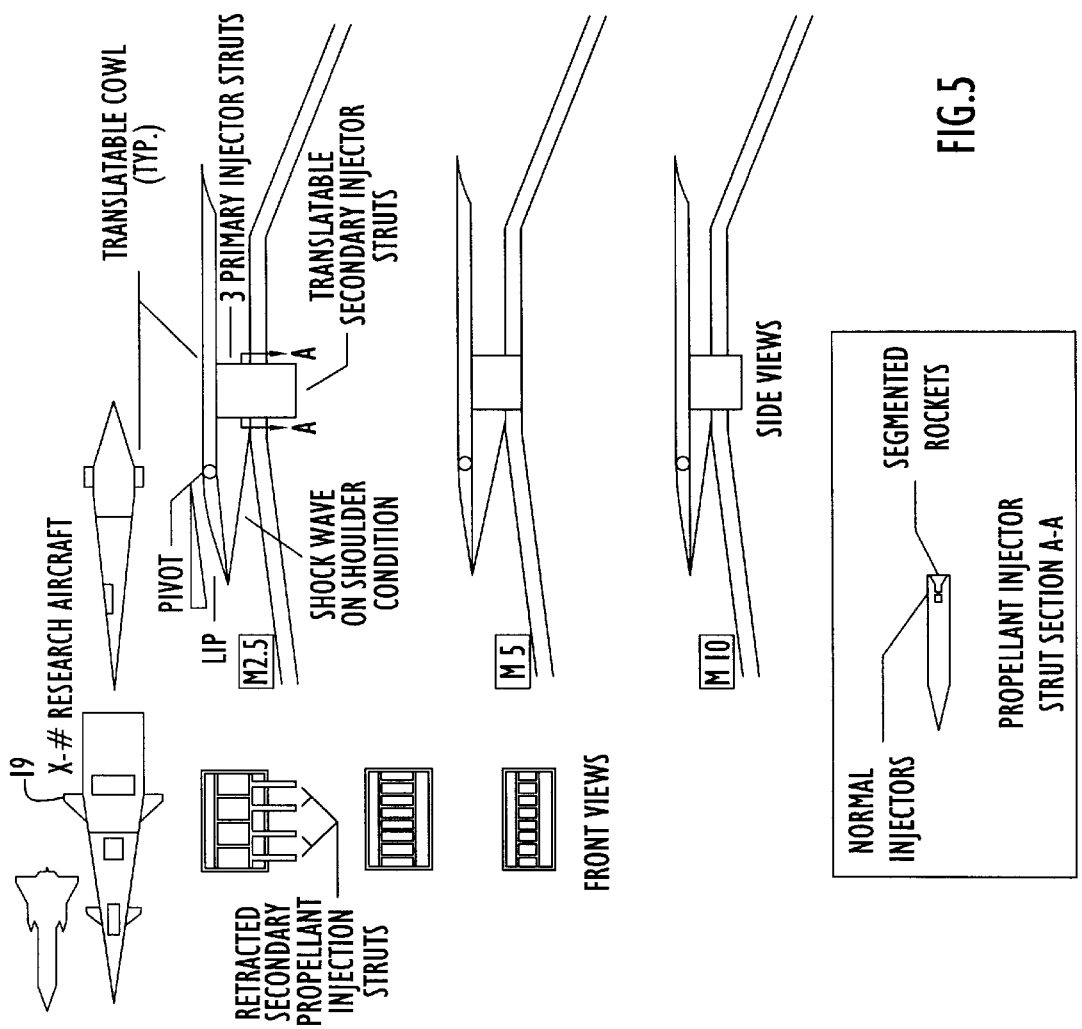
FIG. 5 diagram depicting a detailed testing option of a possible configuration for controllable cowls and struts of an aircraft.

FIG. 5 depicts an example of a detailed testing option to underscore the point that the modularity of the ABPM 15 facilitates flight testing a spectrum of technologies. The example is the supersonic and hypersonic flight testing of Dr. Fred Billig's controllable cowls configuration.

Either the X-# 19 aircraft pilot, a pilot in another aircraft, a ground-control pilot or a combination of these and possibly an autopilot, can control the recovery of the complete X-# 19 aircraft with a deployment sequence of a drogue and a multiple-reefed parafoil. The drogue is deployed at speeds above but close to Mach 1. Step-disreefing the parafoil results in landing speeds near zero fps, thereby permitting a normal landing of the complete aircraft at helicopter-suitable unprepared sites. This capability to land at unprepared, austere landing sites rather than reaching a runway should prove invaluable in achieving full recovery of the vehicle under engine failure or other unplanned conditions. The landing-site selection flexibility is also especially appropriate because of the extremely high speeds and long ground track of the supersonic/hypersonic vehicle during test flights in which no propulsion problems occur.

When manned, the Cruiser 14 section is also an escape capsule and is separable from the ABPM 15 by stage-type jettisoning. The ABPM 15 is then separately recoverable by its own drogue and parafoil 26 system. If the aircraft is flying unmanned and the situation so warrants, the Cruiser-derived section 14 and its jettisoned ABPM 15 can be recovered in the same manner.

D. X-1S and ALCV Flight Envelope with RBCC ABPM

Figure 6:
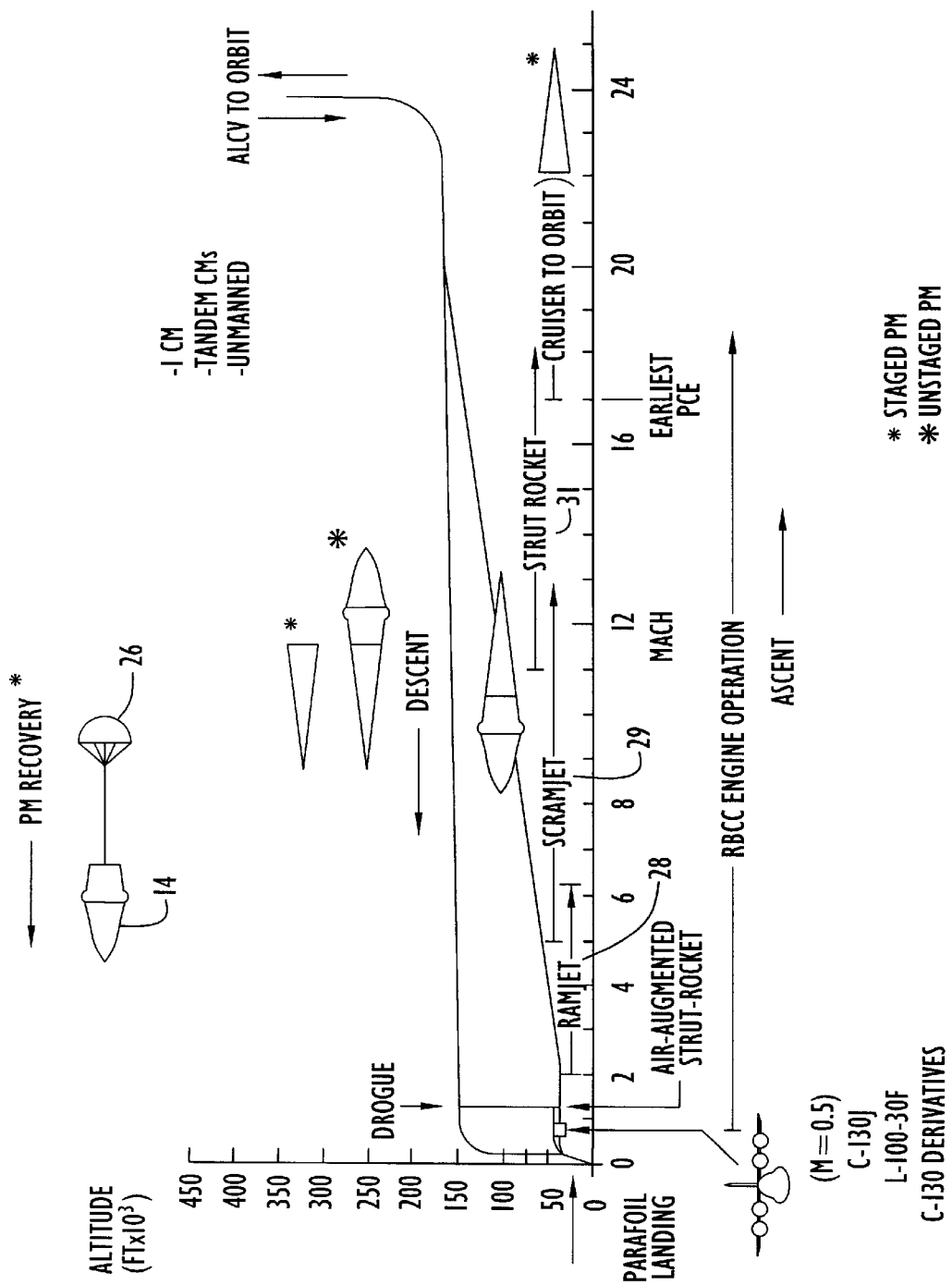
FIG. 6 is a graph of the flight envelope experienced by an X-1S aircraft and the ALCV with a rocket-based combined-cycle.

FIG. 6 illustrates an example of the flight envelope of the X-1S 20 and the ALCV 25 with a rocket-based combined-cycle (RBCC) propulsion module in terms of altitude vs. Mach number. The ALCV 25 is shown as deployed from a C-130 derivative Advanced L-100F or C-130J at 20,000 to 25,000 ft altitude and at a speed equal or greater than 0.5 M. The C-130J will however permit launch at greater than 33,000 feet.

Promptly after the X-1S/ALCV has been extracted, the parachute is jettisoned and the air-augmented strut rocket is ignited. The exhaust plume provides a backup means for jettisoning the parachute. This air-augmented rocket mode 30 operates until the vehicular speed has increased sufficiently for the ramjet mode 28 to function well at or above M2. The proven rocket-cable system is an alternative deployment system on the C-130 type freighter.

Ramjet operation 28 is shown in FIG. 6 in the M2 to M6 speed range, and scramjet operation begins at approximately M5. Transition from ramjet operation 28 to scramjet operation 29 would be done in the overlap speed range of approximately M5 to over M6.

Scramjet operation 29 is shown at M5 to up to or over M11. Transition from scramjet to the strut-rocket mode 31 then occurs, shown in the figure at M11. This rocket mode 31 continues until the propellant is consumed, at a velocity in excess of M17.

Design integration of the Cruiser 14 and the ABPM 15 and the optimalization in and over the propulsion modes maximizes the velocity available on orbit. Factors such as dynamic pressure heating and drag are also involved. RBCC operation to approximately M17 will allow the Cruiser 14 to perform limited on-orbit tasks. Acceleration to velocities greater than M17 results in an approximately equal increase in $\Delta V$ available from the Cruiser's PCE rocket engine.

FIG. 6 illustrates that the Cruiser 14 can be manned with one or two crew members and can also be operated unmanned. Manning affects the Cruiser 14 weight and propellant amount.

Returning from orbit the Cruiser 14 drags off velocity at an altitude of approximately 150,000 feet until the drag chute is deployed at approximately M1.2. At lower altitudes the multiple-reefed parafoil 26 is deployed and disreefed in steps until the full canopy is deployed and the Cruiser 14 is flying as a glider. At any time during the final landing phase, PCE rocket nozzles can be restarted and throttled (sets of nozzles on-off) to provide powered flight while flying at ultra-light aircraft speeds with the parafoil 26.

Vehicular X-1S 20 and ALCV 25 recovery and landing can be performed from all RBCC propulsion modes along the acceleration normal ascent trajectory and within the envelope boundaries.

E. Deployment and Launch from the C-130 Air Freighter

FIG. 7 illustrates one approach to the stowing and deployment of the ALCV 25 with the L-100-30 or the C-130J.

The X-1S/ALCV is shown before and during extraction by an extraction parachute. An air bag assures that the vehicle does not contact the launch aircraft and is retained and reused. The vehicle is supported by slides which translate on rails that distribute the mechanical load while providing directional control. The slide system is retained and recovered after deployment. The slide that enters the airstream is configured to pull away from the X-1S/ALCV aerodynamically during deployment. Alternatively the rails can be roof-mounted in the bay, and result in rail support farther aft than is practicable with floor mounted rails.

F. Flight Test Program

The matrix chart of FIG. 8 provides an example (strawman) flight test program concept that would operate, for example, from the Edwards Air Force Base/Dryden Flight Research Center at Edwards, Calif. The overall flight program is subdivided into two primary and overlapping flight test and research programs. The first chronologically is the flight test and research program using the SR-71 27 as the launch platform with the X-# 19 suborbital aircraft. This SR-71/X-# flight test and operational program is divided into four main phases as shown and described in FIG. 8.

The second and overlapping primary flight test and research program included in FIG. 8 is the flight test and research use of the fully orbital, X-1S 20 vehicle incorporating the full size, tandem-seated Space Cruiser 14 from the private-sector and launched by extraction from the C-130 derivative L-100-30F or the new C-130J freighter aircraft. This program is divided into two main phases.

The overall program is thus shown to contain six main phases. The configuration of the Space Cruiser begins as a truncated, unmanned, dummy Cruiser with the SR-71 as the launch platform and evolves to the C-130 derivative launched, full size, manned Cruiser orbital vehicle.

With the RBCC type ABPM configuration, such as the GenCorp-Aerojet Strutjet engine, where the rocket mode is integrated into the RJ/SJ engine, initial operation may be conducted in the air augmented rocket mode, then tested through transition to the ramjet mode 28 and tested within the ramjet mode 28 of operation while the vehicle remains captive on the SR-71 27. When the flight tests have proven the ramjet mode performance through the Mach 3 speeds compatible with SR-71 captive operation, the X-# 19 aircraft is then deployed and tested in free flight through its ramjet mode 28 speed range.

Transition to scramjet 29 mode operation is then tested and proven over a range of flight conditions. The full scramjet ranges of conditions are then tested, through the transition to the rocket mode. Then, the overall vehicular performance is optimized through the final rocket mode 30 and propellant exhaustion to obtain the maximum vehicular velocity map as a function of flight conditions such as atmospheric conditions, vehicular altitude and speed profiles and vehicular mass properties.

The SR-71 can be shared with two or more X-# configurations and a series of ABPMs 15 for an extended flight test and research program analogous to the long-lived X-15 program. However, during the X-# flight test program, when the system performance is sufficiently proven and its results are incorporated into the X-1S system configuration, the flight testing of the X-1S 20 vehicle(s) is initiated as indicated in the Figure as X-1S Phase I.

The X-1S system is flight tested through maximum suborbital flight in a manner analogous to that used in testing the X-# system. It of course benefits substantially from the results of the X-# program. It is shortened considerably and has substantially lower risk involved due to the X-# program.

The staging and separate recovery of both the ABPM 15 and the Cruiser 14 are proven as indicated. It has been planned that the Space Cruiser 14 will have been launched by expendable launch vehicles such as the Lockheed LLV and flight tested through orbital flight and recovery prior to its incorporation into this EAFB/Dryden air launch flight test program. However an alternative, and quite possibly more cost-effective, plan would be to use the aircraft launch program as the basis for flight testing the Space Cruiser 14 in addition to hypersonic propulsion, obviating the use of the expendable launcher until the Cruiser 14 and its air launch system are proven.

The small size of the Space Cruiser 14, the use of soft tooling for the nonmetallic structure and thermal protective system (TPS) and the modularity of the airframe/ABPM combination provide the potential for working cost-effectively with a changeable set of component and subsystems. This flexibility is especially valuable in pioneering the hypersonic flight regime. For example a spatular nose can be configured into the aeroshell without altering the conical Cruiser primary structure underneath.

Table 2 illustrates an example of a root directory of flight research and test subjects. Table 3 shows a list of properties and related test capabilities of the hypersonic propulsion system testing by the X-# 19 as an HRTV. Table 4 presents overall characteristics of the X-# 19 for use as an HRTV.

G. Summary of Means for Performance Achievement

Key performance enhancers which are applied in the X-#/X-1S/ALCV family of Cruiser aircraft/spacecraft to obtain hypersonic flight, suborbital flight and orbital flight for the Space Cruiser 14 vehicle include: multiple-staging, supersonic/hypersonic propulsion, the very high ballistic coefficient of the Cruiser 14, minimum vehicular surface area, small size and weight for a manned vehicle, lifting surfaces configured for supersonic/hypersonic flight only, and a high cross-section area ratio of the ramjet/scramjet inlet area divided by the maximum cross-section of the vehicle. In the small volume of the slender Cruiser 14, the PCE has, relative to (an alternative) cryogenic propulsion rocket systems applied to the Cruiser 14, high total impulse, and high density-impulse storable bipropellant propellants and very short length compared to a single nozzle system.

TABLE 2

PROPULSION SYSTEMS

RAMJET
SCRAMJET
COMBINED CYCLE
ROCKET-BASED COMBINED CYCLE
SUBSYSTEMS/COMPONENTS

CRYOGENIC/SLUSH HYDROGEN
EXPERT SYSTEMS
FLIGHT CONTROL
GUIDANCE & NAVIGATION (G&N)
ADVANCED STRUCTURES

MATERIALS
INSULATION/COOLING
AERODYNAMICS

HYPERSONIC
FLIGHT CONTROL
THERMODYNAMICS

AEROHEATING
THERMAL PROTECTION
SYSTEM INTEGRATION

TABLE 3

REAL-AIR TEST GAS
REAL INCOMING ENTHALPIES & FLOW
STEADY-STATE CONDITIONS
IMPROVED CFD DATA BASE (& @ SAME TIME)
eg: INLET CONDITIONS
VISCOUS EFFECTS
BOUNDARY LAYER CONDITIONS
MEASUREMENTS W/WO INJECTION
FLAMEHOLDING METHODS
NLET-COMBUSTOR ISOLATION EXPERIMENTS
esp. @ LOWER MACH
NOZZLE & EXPANSION VARIATION
INTEGRATED ENGINE
ATTITUDE CONTROL & VARIATION
INLET OCCLUSION

TABLE 4

LARGE FLIGHT ENVELOPE
AIRBREATHING PM AUTONOMY/FLEXIBILITY

ATTACHES AFT
USE VARIETY &/OR CHANGEABLE PMs
LOW COST & SHARED

SMALL VEHICLE
AIRCRAFT AS REUSABLE STAGE
REUSABLE VEHICLE
DUMMY CRUISER UNTIL PM WORKING

TABLE 4-continued

SAFETY

CRUISER IS LIFE ESCAPE CAPSULE
HELICOPTER-SITE LANDING CAPABILITY
DUMMY CRUISER UNTIL PM WORKING
SR-71

WALK-BEFORE-RUN TEST PLATFORM
OBVIATES POST-LAUNCH ROCKET MOTOR
READILY AVAILABLE

The rocket-based combined-cycle engine, with its integrated rocket, ramjet and scramjet modes, comprises one of the key features of the invention. Within the combined-cycle technology, the scramjet mode technology is also an important aspect of the invention.

The modular configuration of both the X-# 19 and the X-1S 20 vehicles results in great flexibility in the configuration and operation of their airbreathing propulsion modules 15 (ABPMs) 15. Various experimental configuration ABPMs can be designed, built and attached like a stage in the flight test program.

The manned, truncated, Cruiser-derived modules in the X-# 19 aircraft and the Cruiser 14 in the X-1S 20 are practically untouched except in software as ABPMs are attached and flight tested. This modularity provides the opportunity, for example, to test various hypersonic propulsion systems in parallel by sharing the propulsion modules with one or more Cruisers in the flight test program. The military/NASA have then the cost-effective option to acquire several different designs of the airbreathing propulsion systems and if desired, aeroshell configurations, to provide a wide range of hypersonic vehicular and propulsion research and testing. It is their engineering and testing, not materials, tooling and fabrication that may then dominate both the cost and schedule of development.

Furthermore it is likely that the ABPM structure and propellant tank will be largely non-metallic and soft-tooled. However, the small size of the propulsion module provides the opportunity to use materials, fabrication and thermal control systems which would be costly in a large aircraft and not end up with a high total cost in the experimental vehicle.

There is a dramatic increase in specific impulse (Isp) delivered by the airbreathing engine relative to rockets. The air-augmented rocket (ducted rocket) initial engine cycle has a higher specific impulse because of the use of oxygen from the airstream. The ramjet and scramjet cycles increase specific impulse over the Mach 2 to greater than Mach 10 to a maximum of approximately 3,000 seconds and then tapers off to approximately 1,000 seconds as Mach # increases to a value above Mach 10, where the rocket cycle (mode) is used until the propellants are consumed. The ABPM 15 is then staged and the Cruiser's PCE rocket engine started. FIG. 9 indicates the performance of the $H_2O_2$/JP-5 propellants relative to $N_2O_4$/PAAB-1. PAAB-1 is an amine blend and performs similar to MMH.

Because the Cruiser's non-metallic, cone-elliptical aeroshell thermal protective structure fits over the non-metallic conical primary structure and is configured to be readily removed and replaced between flights, variations of its body shape can be made and flown. For example a spatular nosed aeroshell can be substituted for the normal very small nose radius, spherical nosed aeroshell. Combined with variations of the airbreathing propulsion modules (ABPM) 15, even non-axisymmetric ALCV types can be flight tested.

From time to time, as improvements are made in the X-# and X-1S airbreathing propulsion modules in their flight programs some of the changes will be adopted in the propulsion modules procured for ALCV use. In a similar way, changes to the Cruiser system will be produced by its development and operations teams and may be incorporated into the X-# and/or X-1S vehicle programs.

H. Launch Vehicle Mix

The key goal for air launch is to achieve very low cost to orbit. Key utility attributes of air launch are responsiveness and geographic flexibility. However, air launch is not a panacea. It is not capable of being used in some of the types of missions and tasks which the Cruiser system will be called upon to perform. For example the ALCV system does not provide the means for launching the Cruiser 14 accompanied by support systems and accessories such as sidecars, external propellant tanks and payloads which the Cruiser 14 will support on orbit but which cannot be stowed within the Cruiser 14. Therefore, after air launch is operational, the private sector will also continue to launch Cruisers on expendable launch vehicles when the mission requirements dictate, and on reusable launch vehicles (RLVs) when they become available.

For completeness it is noted that two or more C-130 derivative launch aircraft flying in close proximity, but not limited to being in close proximity, can launch two or more ALCVs 25 to ascend to orbit at the same time. This would, for example, support on-orbit "Buddy" operations.

I. Optimal Propulsion Configuration

The optimal propulsion system for the X-# 19 the X-1S 20 and the ALCV 25 vehicles is the rocket-based combined cycle (RBCC) engine exemplified by the Aerojet Strutjet engine described by Siebenhaar et al (noted above). The RBCC system reduces dramatically the scramjet maximum speed requirements. The most important reduction in requirements is this reduction in Mach number required to be reached by the RBCC scramjet. RBCC scramjet operation is only required to result in final (airbreathing propulsion) vehicle speeds as low as in the Mach 8 to Mach 11 range. This results from the RBCC then transitioning from its scramjet phase 29 to its rocket phase 30 for the final acceleration to the maximum velocity before staging the ABPM 15 and starting the Cruiser's plug-cluster engine (PCE) for orbital injection and subsequent maneuvers.

The speed requirement which non-RBCC ramjet/scramjet engines must meet is between Mach 17 to more than Mach 20, depending on how much propellant must be held in reserve for on-orbit maneuverability of the Space Cruiser 14 and depending upon whether the Cruiser 14 is a single or two crewmember model. The two-crewmember Cruiser contains approximately 30% less propellant mass in the Cruiser 14 (not the ABPM) than the standard single-seated configuration due to the obviation of the spherical tanks to provide the space for the second crewmember station.

The reduction in required scramjet speed, by approximately 50%, reduces substantially the speed-correlated risks associated with the development and use of the scramjet. Indeed, a scramjet mode that cannot attain more than Mach 11 may be excellent for the X-1S and ALCV 15.

Another important feature, unique to the RBCC, is the elimination of the post-launch rocket motor (PLRM). When the vehicle is deployed from the freighter aircraft, the air-augmented rocket phase of the RBCC is used to accelerate the vehicle to ramjet start speed. Obviation of the PLRM at the aft end of the vehicle moves the CG well forward, allowing the vehicle to be located before launch further aft in the launch aircraft and shortens the vehicle substantially. Furthermore, the elimination of the PLRM by the RBCC engine obviates the safety concerns etc. concerning the staging and disposal of the spent PLRM.

J. Military/NASA Efforts

The long history of "X" series aircraft in flight research and development by NACA/NASA and the military, both Air Force and Navy, with great benefit to both military and commercial aviation, suggests strongly that NASA/DoD not only extend their participation to the high performance X-# ·hypersonic aircraft and to its benefits to hypersonic flight technologies, but that military/NASA also project "X" vehicle capabilities into highly cost-effective in-space and transatmospheric flight test operations in the national interest. The vehicle concepts herein also draw upon the long history of the military and the Department of Energy in the Advanced Ballistic Reentry Systems (ABRES) flight test programs. The Space Cruiser's 14 synergistic combining of the X-series program and technology from the ABRES technology programs results in the extension of the "X" aircraft into the high performance space vehicle and into the high hypersonic L/D regime required for large orbital plane changing by means of the transatmospheric, synergetic plane change in the upper atmosphere.

Figure 10:
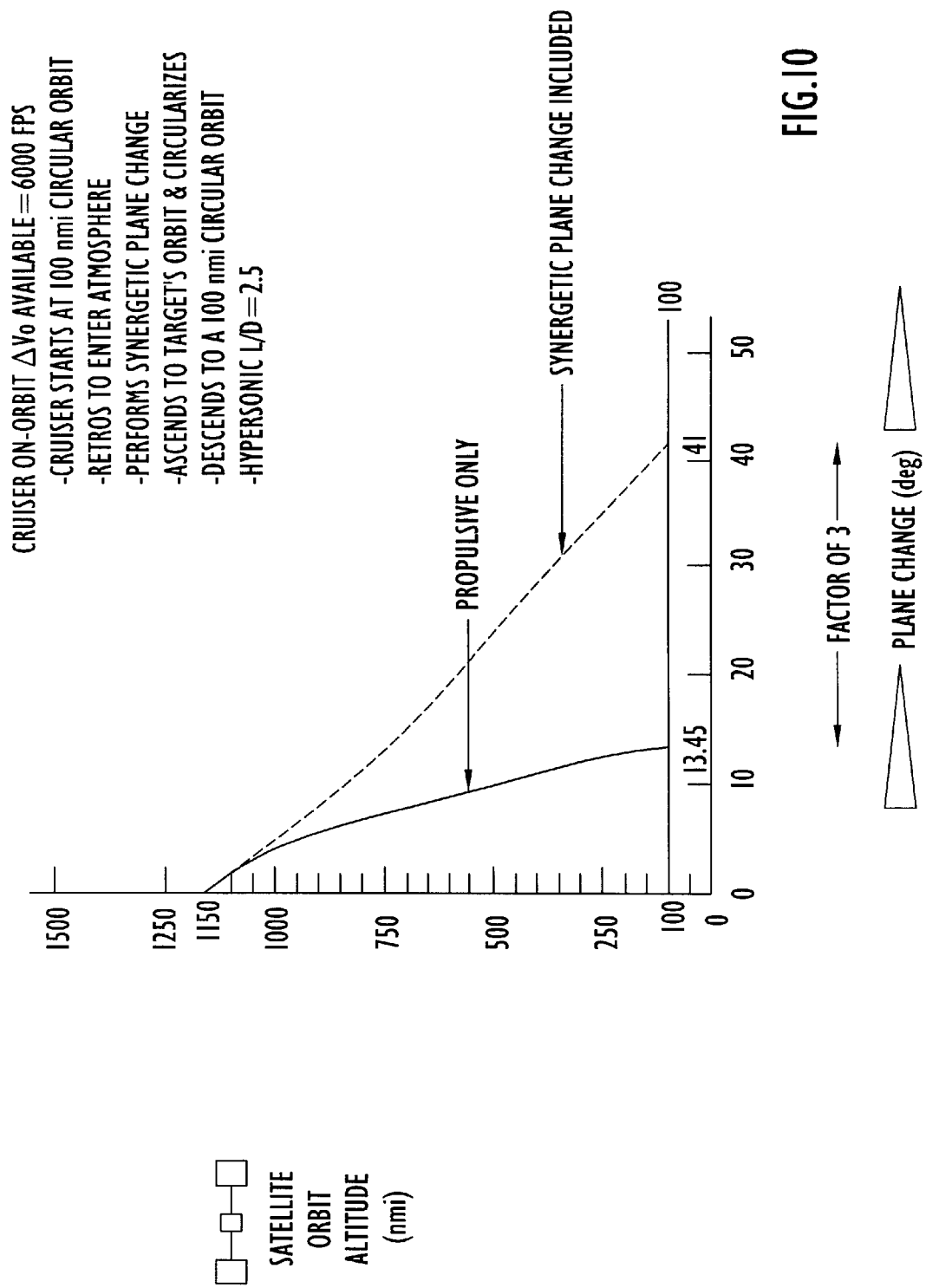
FIG. 10 is a graph relating satellite orbit altitude to plane-change angle displaying the advantages of a synergetic plane change.

FIG. 10 illustrates the large plane-change angle advantage that results from the synergetic plane change maneuver with the Cruiser's 14 high hypersonic L/D capability in comparison with intraspace plane changing by purely [rocket] propulsive means.

In this context of intraspace and transatmospheric research and experimentation, the present invention supports the military/NASA and the private-sector by presenting the X-1S manned space vehicle concept, a variant of the X-# 19 aircraft. The X-1S configuration will be finalized with the results of the hypersonic propulsion and other systems of the X-# 19 aircraft (see FIG. 1). The air launched X-1S space vehicle system would be both the experimental flight test bed and the prototype for the Air Launch Cruiser Vehicle 25 (ALCV) intraspace and transatmospheric, adroit, highly maneuverable vehicle and its launch system, missions, payloads and human participation.

III. SPACE CRUISER SYSTEM CHARACTERISTICS

This section presents selected elements of the Cruiser 14 design and commercialization.

A. The Problem

The commercial manned space servicing, support and transportation vehicle must go at least where the satellites are or can go, where the action is, where the need is, and must do so cost-effectively on a commercial basis. However manned spacecraft concepts and programs, American, foreign and international, have been and are continuing to be characterized by many or all of the following negative factors: space maneuverability which is limited severely; payload-maneuverability in space which is limited severely; substantially constrained orbital flight envelopes; inability to perform synergetic and other transatmospheric maneuvers in and out of the atmosphere; short flight duration due to cryogenic propellants; weather dependency of launch and recovery; launch schedule inflexibility; dependence throughout their mission on extensive ground support monitoring, tracking, control and communications; dependence on runways for landing; little or no space rescue capability; and large vehicular, operational and infrastructure costs. These characteristics and capability limitations contrast sharply with the autonomy, flexibility, maneuverability, responsiveness and cost-effectiveness required of a commercially viable manned space service.

B. The Need

The specific vehicular need is for a highly cost-effective, essentially omni-mission vehicle that integrates well with commercial launch vehicles and aircraft launch.

The key in-space performance requirement is payload-maneuverability or, equivalently, (payload)×(velocity). Whatever the payload weight and dimensions, the maximization of achievable velocity is "the name of the game". Another key requirement is that the vehicle be low in cost to obtain, maintain and operate.

C. Cruiser Design Goals

1. Man-machine unification . . . maximization of the performance of the Cruiser system by means of optimal mutual support between the vehicle and man's on-site capabilities.

2. Maximum delta-velocity . . . While not all missions require large velocity changes, chemical rocket propellants greatly constrain achievable performance relative to what is desirable.

3. Maximum payload-maneuverability . . . Whatever the payload weight may be the design need is to maximize the velocity that can be imparted by the vehicle. External carry of payload eliminates payload volumetric constraints and minimizes vehicular weight.

4. Cislunar operations . . . Go where the need requires. In velocity space, orbital altitudes equivalent to the lunar distance result from velocities close to those required for attaining geosynchronous altitude. Furthermore, lunar transportation is a high potential market.

5. Synergetic-maneuverable . . . The high delta-velocity ($\Delta V$) required for achieving even a modest plane change in low earth orbit (LEO) results in a high pay-off for performing a lifting-turn plane change followed by a rocket-propelled return to space flight.

6. Minimum weight and volume . . . Optimizes the Cruiser payload and velocity to orbit during the launch phase. Maximizes the available (payload) ×(velocity) of the Cruiser 14 and permits up to a substantial reduction in transit time during maneuvers.

7. Modular system . . . Cruiser model options for best performance and widest application; external additional carrying of payload, propellants, propulsion modules, life support consumables, support equipment such as accessories and tools, etc.

8. Launch options . . . Compatible with as broad a spectrum as possible of expendable and reusable launch vehicles. Wherever possible the Cruiser 14 should enhance the combined performance and cost-effectiveness of the launch vehicle (LV) and the Cruiser as a system. Examples are: reduce substantially the size and weight of the LV shroud; reduce the LV aerodynamic drag by serving as an aerospike at the nose of the LV; eliminate the need for the third stage through substitution of the Cruiser 14 as the final stage; and eliminate the LV guidance and navigation system through use of the Cruiser's guidance and navigation system.

9. Austere-site landing . . . Lands at helicopter-suitable, unprepared sites.

10. Launch and listen . . . Autonomous flight options with respect to ground control operations.

11. State-of the-Art . . . Accomplish these goals within the state-of-the-art and where practical, using developed hardware.

12. Minimum cost . . . Small, soft-tooled, low-cost vehicle; modular system for facilitating tailoring to the mission; reusable vehicle; rapid turn-around; flexible and when required, long duration flight capability; maximum payload per flight; maximum maneuverability; minimum launch cost; austere control and recovery systems; minimum refurbishment and servicing required between flights; long-term commercial Cruiser 14 productive lifetime.

D. The Solution

The limitations listed above in Section III A (i.e., the Problem) are not inherent in the Space Cruiser system. The Cruiser 14 differs considerably from other manned and unmanned space vehicles that have been designed, built or proposed. It differs in ease and speed of development, safety, configuration, performance, in launch and recovery, in its costs and in capability for commercial success.

Figure 11:
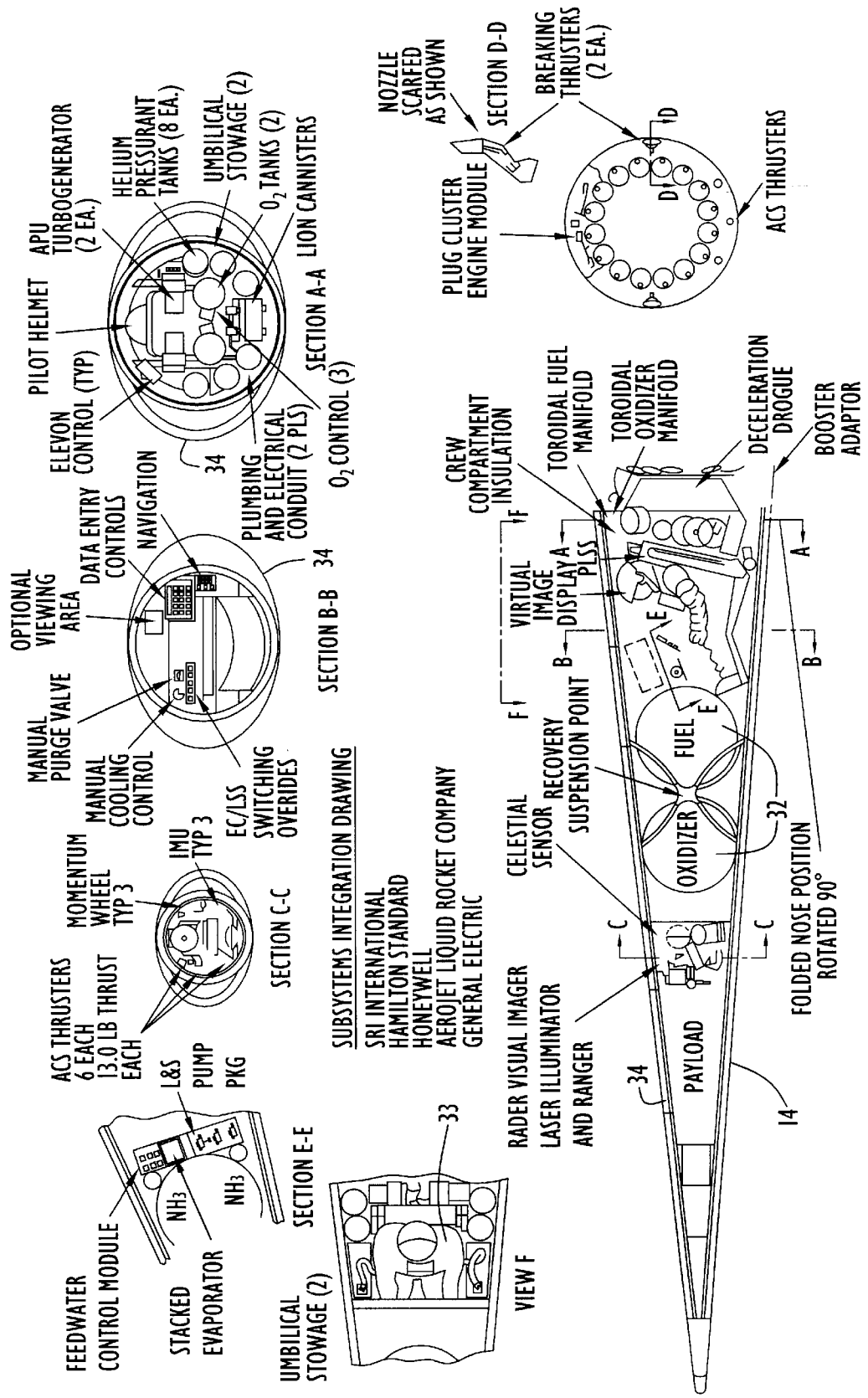
FIG. 11 is a diagram of a possible design depicting the inner and outer shells as well as equipment location for the ALCV.

Referring to FIG. 11, the spherical tanks 32 for the storable propellants are located at approximately the center of gravity (CG) of the vehicle so that the consumption of the propellants will not shift the CG. The pilot 33 is seated as far aft as possible to allow as much room as possible for a ninety-fifth percentile male pilot. This also allows as much room as possible for the tandem cockpit and in the case of the lifecraft model 23, the container-cabin. The wing tanks do not appear in the inboard profile but they are located in the aft section between the conical structure and the inside of the aeroshell.

As shown in FIG. 11, the Cruiser 14 preferably has an elliptical cross-section, thermal-protective, outer aeroshell 34 over the conically shaped basic vehicle structure. This outer vehicular shape is termed herein a cone-ellipse or elliptical cone. The aeroshell 34 provides the thermal protection during atmospheric entry and hypersonic flight. It is readily removed, refurbished and replaced between flights if required. The volume between the right elliptical cone aeroshell 34 and the basic right circular cone structure is used primarily as "wing tanks" for the storable propellants.

The Cruiser 14 is divided into nose and aft sections at approximately its longitudinal center point. By way of example, the height at the aft end is approximately 57 inches. There is an 8 cubic foot payload bay in the aft end of the nose section and a 4 cubic foot payload bay at the aft end of the aft section within the ring of rocket nozzles.

There are several alternative cruiser configurations, all of which are air-launchable. Three of these structures are:

1. a single-seater model (FIG. 11) with internal spherical propellant tanks 32 forward of the pilot plus two "wing tanks" between the conical basic airframe and the cone-elliptic aeroshell 34;

2. a two-place, tandem configuration without the spherical tanks 32; and 3. a single seater model whose aft section is adapted to contain a module called the container-cabin. The container-cabin can house up to two persons in the supine attitude without space suits in a pressurized, shirt-sleeve environment. This is the "lifecraft" model 23 and can for example be docked at a manned space station for emergency crew return or for stand-off-and-return to the space station during emergency operations.

E. Vehicular Shape Configuration Rationale

1. Reasons for Configuring for Entry

Entry capability is required for autonomous operation, proper energy management and safety. Expanding this statement:

Autonomous entry and recovery enables the Cruiser 14 to operate independently of recovery by another vehicle, such as the Space Shuttle Orbiter and future SSTOR vehicles. It does not however obviate those options.

Proper energy management is vital to maximize vehicular maneuverability in meeting the demanding energy requirements of space missions.

Safety is vital to: mission success; the crew, the avoidance of rescue costs; the minimization of insurance costs; and obtaining and preserving popular, business and political confidence in the future of the Cruiser 14 in the space servicing and transportation business.

In terms of energy management, the capability to enter and maneuver in the atmosphere enables important capabilities such as:

a. Up to doubling of the mission delta-velocity by maximizing the propulsive velocity available to do mission tasks when less velocity is required to reach the atmosphere for return to earth than to return to a rendezvous point in space.

b. Aerobraking in the atmosphere rather than using retro-propulsion with its resultant weight penalty and loss of up to the entire subsequent maneuver capability.

c. Use of aerodynamic lift to change the direction of flight (orbital plane change) and then to return to space flight. This energy-efficient maneuver is called the synergetic (or synergistic) plane change and is efficient for a vehicle with the lift-to-drag (UD) ratio and low drag of the high slenderness ratio body shape of the Cruiser 14. The synergy is the working together of the orbital motion forces and the aerodynamic forces due to the vehicular aerodynamic shape in the atmosphere at hypersonic speeds.

d. Use of aerodynamics to maneuver to a safe landing on earth and to minimize the need for pre-entry propulsive maneuvers.

In safety terms, the entry capability and performance provide a recovery return choice between the earth and a space station or other space vehicle as a function of the time available to reach sanctuary, the specific failure, problem or damage that forced the premature recovery or abort, medical needs, or subsequent docking risks to an on orbit vehicle or station. The space plane can serve as a rescue vehicle for other manned space-craft.

Without the entry and landing capability a self-propelled manned vehicle is neither efficient nor safe. Without easy access to the entry and landing capability of a suitable space plane, a manned space station is not safe.

2. Reasons For The Generic Conical Shape

Due to ballistic missile tests, the slender cone is the most understood and tested shape for hypersonic entry. The slender elliptical cone is the shape of the ballistic missile reentry body for reasons in concert with the Cruiser 14 needs, particularly the need for low drag. Alternatively, the slender elliptical cone is optimal for its higher lift-to-drag ratio while retaining much of the low drag characteristic of the slender right-circular cone.

These shapes result in the minimum loss of velocity during the endoatmospheric maneuvers. Therefore the least amount of propellant is consumed in returning to space and the maximum footprint or area in which the vehicle can fly during recovery obtains.

The pure (right-circular) cone and the elliptical cone result in the smallest exterior surface area consistent with high aerodynamic performance at hypersonic speeds. Surface area means weight in the thick-skinned, thermally protected entry body. Minimization of vehicular weight is vital to maximize propulsive maneuverability, the optimization of payload weight carrying capability and to the performance and size of the launch vehicle.

The slender conical or low eccentricity elliptical conical shape is correct for the generic highly maneuverable space plane. The atmosphere will be with us indefinitely and the basically conical slender vehicle shape will remain optimum.

Orbiter-like vehicles exemplified by the Orbiter, the HOTEL, the Buran and the Hermes are designed to meet a substantial internal payload volume requirement for launching and returning payloads from space to earth. They require large winged, non-axisymmetric shapes and are penalized greatly in weight and performance in space. They also require large launch vehicles and result in high launch costs.

An important advantage of the symmetry of the Cruiser 14 is that it can fly with either the bottom or the top surface windward. Thus it inherently has redundancy in presenting its body to the extreme thermal effects during entry and hypersonic flight. If the bottom surface of the vehicle is damaged, the vehicle is then simply rotated 180 deg and flown safely upside down until the aero-thermal loads are sufficiently low or, if flying on a recovery profile, until the drogue parachute is deployed.

The slender elliptical cone entry body is optimal for: synergetic plane changes; maximum payload-maneuverability (wing-tanks); operations with small internal payloads; lightest weight; and lowest cost to build, maintain and operate. Other shapes can be best used where substantial internal payload volume from space to the ground is the driving requirement, i.e.: payload-to-ground vehicles.

The use of substantial-cargo vehicles in higher orbits or for high velocity-change maneuvers is not cost-effective or generally practical. It seems appropriate to point out that it takes the "deep pockets" of the government or at least substantial subsidization to acquire and operate such vehicles.

F. Representative Cruiser System Specification

Figure 12:
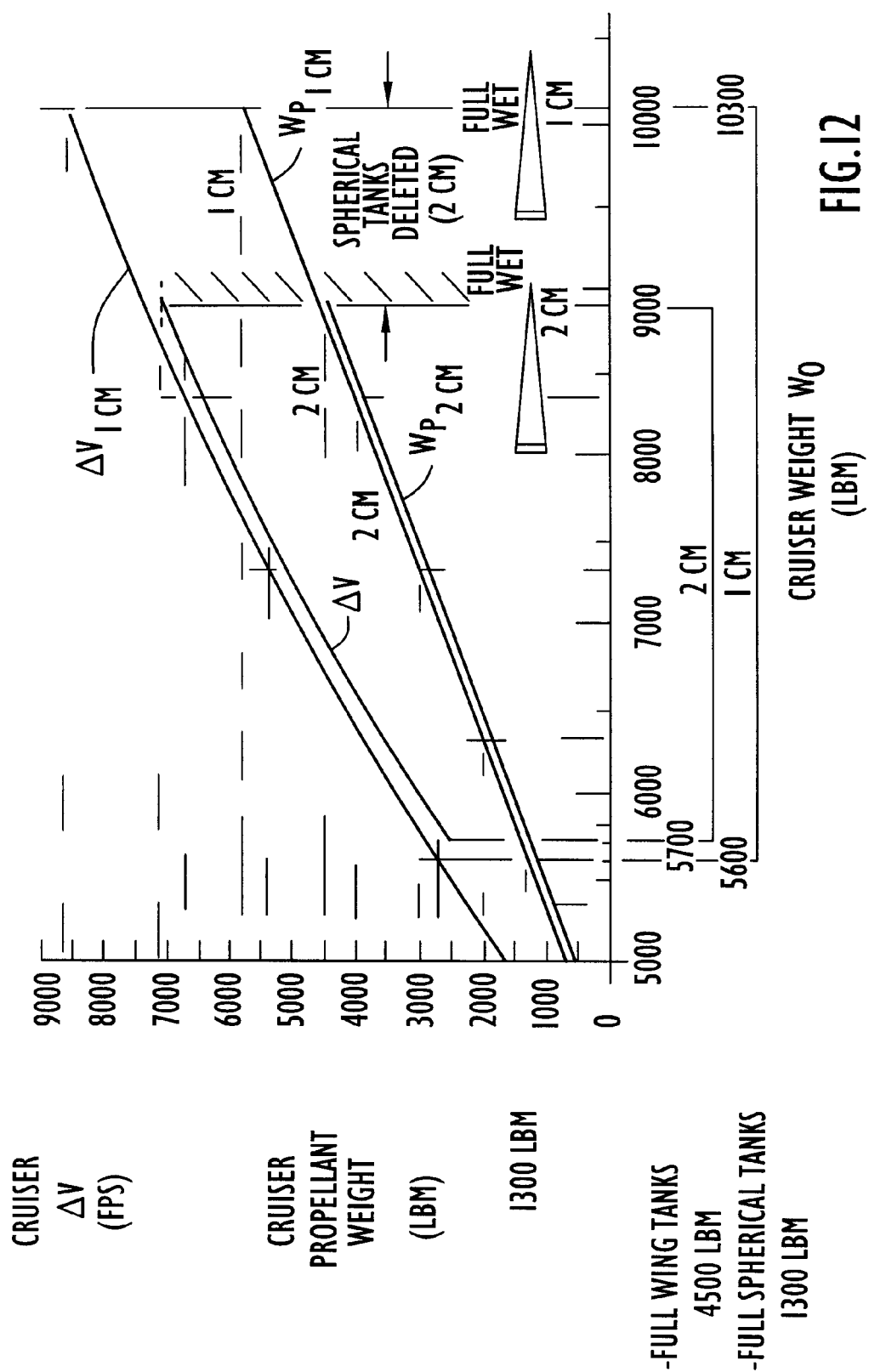
FIG. 12 is a graph relating performance projections of the ALCV to weight.
Figure 13:
FIG. 13 is an artist's depiction of the ALCV.

FIG. 12 presents current performance projections in terms of the delta velocity and propellant weight, both as a function of Cruiser weight and for both one and two crew members. As noted the 1300 lbm ordinate value is the maximum (capacity) weight of the propellants in the spherical propellant tanks.

To provide further technical context and insight, consider a brief Cruiser system description in a specification type format The Space Cruiser system is represented by the following overall vehicular system specification in Table 5 for the single-seat and the tandem seat models. The lifecraft 23 (LC) model is not included because the LC is a specialized model that is not used in the basic operations of the business.

TABLE 5

CRUISER REPRESENTATIVE SPECIFICATIONS

CREW:

Single-seat aft section pilot. Tandem-seat aft section 2 pilots or 1 pilot plus specialist
SINGLE-CREWMEMBER CRUISER MAXIMUM DELTA-VELOCITY (NO PAYLOAD):

Internal spherical tanks plus "wing" tanks 8700 fps allows 7 round trips between 100 nmi and 270 nmi circular orbits. External tankage can be added.
TWO-CREWMEMBER MAXIMUM DELTA-VELOCITY (NO PAYLOAD)

Wing tanks only    7200 fps
Notes:
* 7200 fps allows 6 round trips between 100 nmi and 270 nmi circular orbits. External tankage can be added.
* The two-crewmember Cruiser can tow the Shuttle's external tank (ET) from 100 nmi circular orbit up to 270 nmi (or recover the ET from 270 nmi to 100 nmi).
LAUNCH & ORBIT EXAMPLES: (Circular orbits except GTO)

Commercial 2-stage Delta 6920 Florida (ESMC)
    1 crewmember 2050 nmi circular & recover (i = 28.7)
    (Cruiser propellant limited by Delta 6920 throw weight)
    2 crew members 1950 nmi circular & recover (i = 28.7)

TABLE 5-continued

CRUISER REPRESENTATIVE SPECIFICATIONS

Commercial 2-stage Delta 7920 at ESMC
    1 crewmember 2900 nmi circular & recover (i = 28.7)
    2 crewmember 2550 nmi circular & recover (i = 28.7)
    1 or 2 crew members to geosynch. transfer orbit (GTO)
Commercial Delta 6920 California (WSMC) polar orbit
    1 crewmember 1000 nmi (Throw weight limited)
    2 crewmember 950 nmi (Throw weight limited)
Commercial Delta 7920 at WSMC polar orbit
    1 crewmember 1825 nmi (Throw weight limited)
    2 crewmember 1740 nmi (Throw weight limited)
Commercial Delta 6920 WSMC Sun-synchronous (i = 98.7)
    2 crewmember 725 nmi
Commercial Delta 7920 WSMC Sun-synchronous (i = 98.7)
    1 crewmember 1585 nmi
    2 crewmember 1510 nmi
Potential lowest cost launch system
    Air Launch Cruiser Vehicle (ALCV) with
    launch price goal of $1–2 Million.
        Internal payloads only
        Launched from commercial L-100–30 or the
        future Advanced L-100F
        Freighter. These aircraft are derivatives of the C-130.
ENDURANCE:

With internal consumables 24 hours
    With internal & external consumables up to TBD days
WEIGHT:

Dry: 1 crewmember 4300 lb
    2 crew members 4400 lb
    Wet 1 crewmember10100 lb
    2 crew members 8900 lb
VEHICLE LENGTH:

Nose joined 26.5 ft
    Nose folded 13.5 ft
    Air launched 27.5 (plus) ft
INTERNAL PAYLOAD VOLUMES:

Nose bay 8 cubic ft
    Aft bay (Not avail when use aerobrake) 4 cubic ft
    Spherical tanks bay volume adds appx. 20 cubic ft
EXTERNAL PAYLOAD VOLUMES (In space):

Side mounted (Slide-saddle) on each side    xxx cubic ft
    Front mounted    unlimited
    Pulled with tow bar unlimited
EXTERNAL PAYLOAD VOLUMES (During launch with Cruiser):

Governed by the launch vehicle
    Example:    Delta stage diameter = 8 ft
                Standard Delta payload fairing = 9.5 ft outer diameter
                Special shroud for Cruiser as payload = 8 ft
                (Continues Delta diameter)
    Bay-stage with internal container for cargo
        Baystage outer diameter = 8 ft
        Baystage internal container:
            Diameter = (LV dia-1 to 2 ft)
            Length = 12 ft (example)
RECOVERY:

Drags-off velocity followed by drogue chute & multiple-reefed Parafoil
    Lands at any helicopter-suitable land site
    Low-thrust PCE-powered landing site selection while under Parafoil
    Truck pick up and delivery to hangar
    TURNAROUND TIME:    Similar to high performance aircraft
EXAMPLE ATTACHMENTS & ACCESSORIES:

1. Sidecars with vacuum & air atmosphere (shirt sleeve) modes, toilet.
2. Slide-saddle for attaching sidecars, payloads, sideseats, Cruiser spares, tool boxes, etc.
3. Astronaut Nosemount for working on space asset in front of the Cruiser.
4. Low-weight non-metallic nose-dock that is attachable from the Cruiser.
5. Velcro (TM) side-docking gear.
6. Whisker pole(s) & attachments for 20–30 ft reach extension for one or two astronauts located at any position on the Cruiser.
7. Towbar.

Lifecraft Solution

The basic solution approach is to provide a unique modification to the type of manned spaceplane known as the Space Cruiser 14 so that it is transformed into a lifecraft 23 capable of transporting up to two astronauts in a shirt-sleeve environment plus a space-suited pilot and which can be docked or otherwise attached to the space station (SS) it serves.

According to the present invention, the Cruiser 14 is modified to accept and transport to a safe place a sanctuary module or "Container-Cabin 35 " (C-C) in which the shirt-sleeved astronauts are contained. The safe place can be for example: (1) back down to Earth, (2) another spacecraft capable of accepting the C-C 35 for release of the astronaut (s) it contains, and (3) the lifecraft itself for a standoff and sit capability after leaving the danger area.

The lifecraft invention disclosed herein is designed to solve the problem of transporting the C-Cs 35 as enumerated above from the space station or other type spacecraft in which they were located.

The term "lifecraft" is derived from the analogy to lifeboats for boats and ships. Herein the term space station is used without loss of generality to connote any type of spacecraft which contains Container-Cabins 35 available to sanctuary by the crew.

The C-C is maintained ready in the space station for immediate ingress by one or two astronauts in response to a contingency situation such a s a depressurization, a contaminated environment or a fire. It is a sanctuary capable of isolating and sustaining two astronauts during a period of abnormality or emergency.

The lifecraft must be capable of operation in space and of entering the atmosphere and returning to a safe landing. Operation in space includes the capability for the lifecraft to remain docked and dormant for long periods of time, such as up to years, and to function safely at any time.

Figure 14:
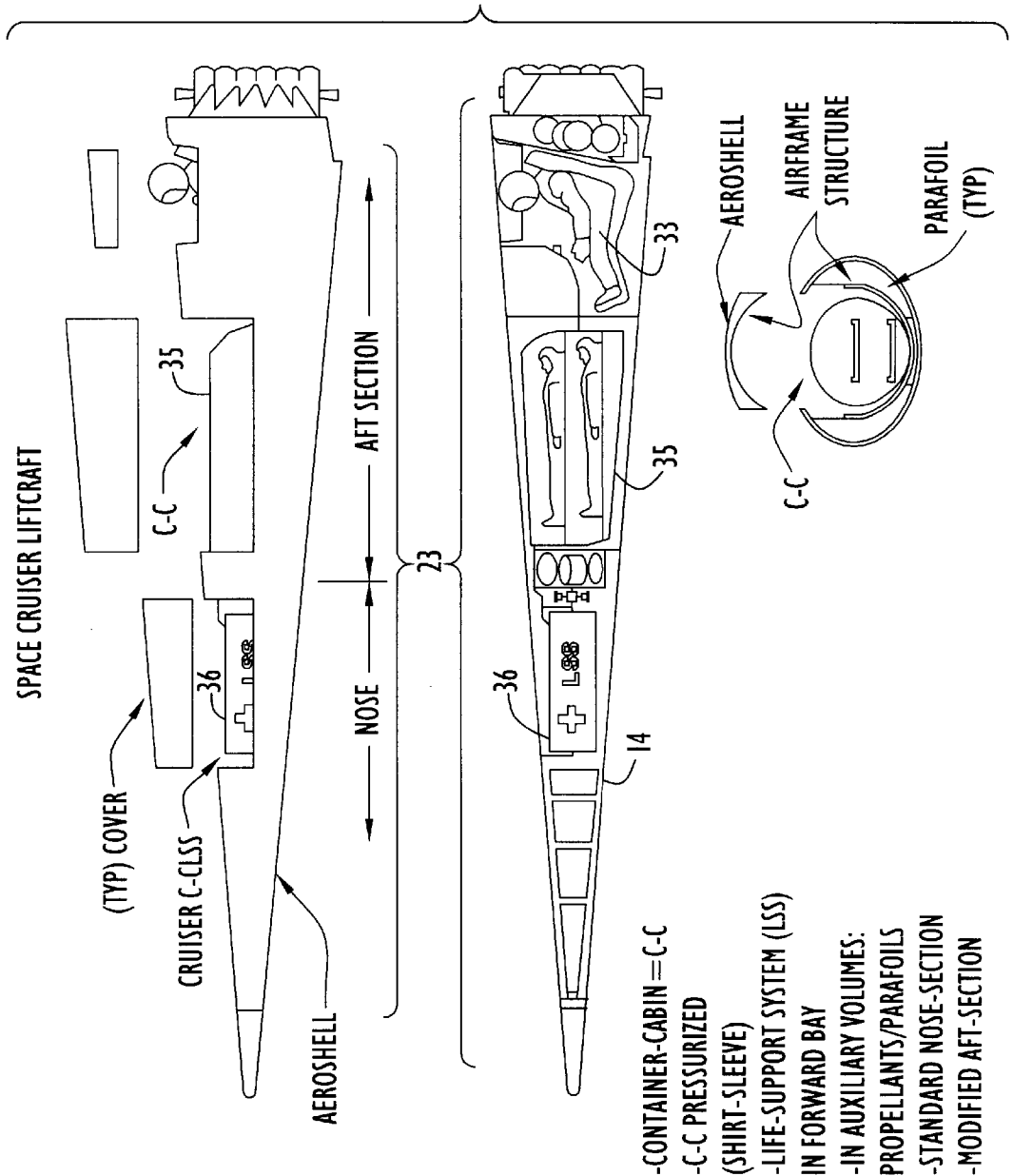
FIG. 14 is a diagram of the ALCV being used as a lifecraft or personnel transport.

The drawings in FIG. 14 titled "Space Cruiser Lifecraft" present the Space Cruiser 14 that has been modified to form the lifecraft 23. Its payloads are the Container-Cabin 35 in the large aft payload bay, and in the forward payload bay a life support and environmental control system (LSS) 36 for the Container-Cabin 35.

1. The Space Cruiser's aft section is modified to carry one C-C 35 as shown in which one or two persons can be carried while in a shirt-sleeve environment and returned to earth in as little as approximately 30 minutes.
2. One or more lifecraft is/are docked to the space station (SS) or other object.
3. Before a contingency situation arises the C-C 35 is located within the manned space station where it can be readily accessed by station crewmembers.
4. The C-C 35 is configured where practical to be easily moved from its pre-contingency, normal position (such as a space configured for a standard rack) to other areas of the space station while containing one or two astronauts in a shirt-sleeve environment and condition. It is configured to be readily moved be a single astronaut who is in a space suit or other type protective garment.

5. The C-C 35 is configured to be readily moved through the station's airlock(s) nd then to the waiting lifecraft 23. The C-C 35 is configured to be readily loaded into the lifecraft 23 and to enable the lifecraft 23 to transport the inhabited C-C 35 in space and back to Earth.
6. Each C-C 35 is placed for example in a standard-rack position in a SS module. Two C-Cs 35 per module could cover a module crew of four. C-Cs 35 can be added or subtracted from any SS module as the size of the module's crew is changed from time to time.
7. If an abnormality or emergency occurs up to two astronauts can open the closest C-C door and step inside. This takes seconds of time instead of the minutes required to don a space suit and is less than the time required for the astronauts to leave the module and move to another SS sanctuary such as another SS module or node or to a docked return vehicle. This very short time can for example allow the closing of the module hatch in the shortest possible time to isolate the module from the rest of the SS and thereby minimize the unwanted effects on the balance of the SS.
8. When occupied, the C-C 35 provides its own environment independent of the SS. This autonomous C-C Environment Control & Life Support System (CCEC/LSS) is for the most part attached externally to the back of the C-C 35. When the C-C 35 is entered by an astronaut its CCEC/LSS becomes operative and will control the environment automatically, with manual control also available from within the C-C 35. SS power and other sources of supply for air etc. may be selected and used until the astronaut inhabitant(s) of the C-C 35 switch to the autonomous CCEC/LSS.
9. If the safety abnormality or problem lessens or disappears then the astronauts can open the C-C door and step out into the module. If the problem does not disappear, then a suited astronaut can come from another module or vehicle and if possible fix the problem. If the problem is not fixable in a reasonable time the suited astronaut can simply move the C-C 35 to a node or another module where the C-C 35 door can be opened safely by the contained astronauts or be an external crewmember.
10. There are various scenarios and modes of operation with the C-Cs 35 depending on the configuration of the SS. If necessary the space-suited astronaut can move the C-C 35 to the lifecraft and install it.
11. There is a LSS 36 unit stowed in the forward payload bay of the Cruiser 14 that can be plugged into the C-C 35 as an alternative to the CCEC/LSS attached to the C-C 35. This feature provides redundancy and extends the duration of life support. This pre-positioned LSS can be a version of the CCEC/LSS or use components designed for the CCEC/LSS.
12. The lifecraft may stand off and return to the SS or can be flown back to earth with the C-C 35.
13. Medical supplies for first-aid will be provided within the C-C 35.
14. The capability for individual and cooperative administration of medical assistance will be provided within the C-C 35.
15. Communication between the C-C 35 inhabitants and the lifecraft pilot and to external locations will be provided.
16. Anti-claustrophobic measurers are provided to minimize or avoid problems from claustrophobia.
17. The positions and attitude of the contained astronauts can be adjusted after ingress. This includes the option to rotate the astronauts to face each other or be front-to back.
18. C-C Self-test and readiness instrumentation can be provided.
19. Suitable means for holding the astronauts will be provided in the C-C 35. this includes seat and shoulder belts and boot straps.
20. Suitable shock mitigating means will be provided in the lifecraft and within the C-C 35 s required for safety during vehicular-induced shocks and other dynamics such as are caused by vehicular parachute deployment and disreefing and vehicle landing.
21. The C-C shell structure can be constructed to be flexible rather than stiff so that for example the C-C 35 can be compressed for ease of storage/stowing. Thus for example the C-C can be stowed against a wall or other surface rather than inside a standard rack volume. the C-C 35 can be quickly pressurized to expand it to its normal shape for occupancy.

Container-Cabin Solution

Figure 15:
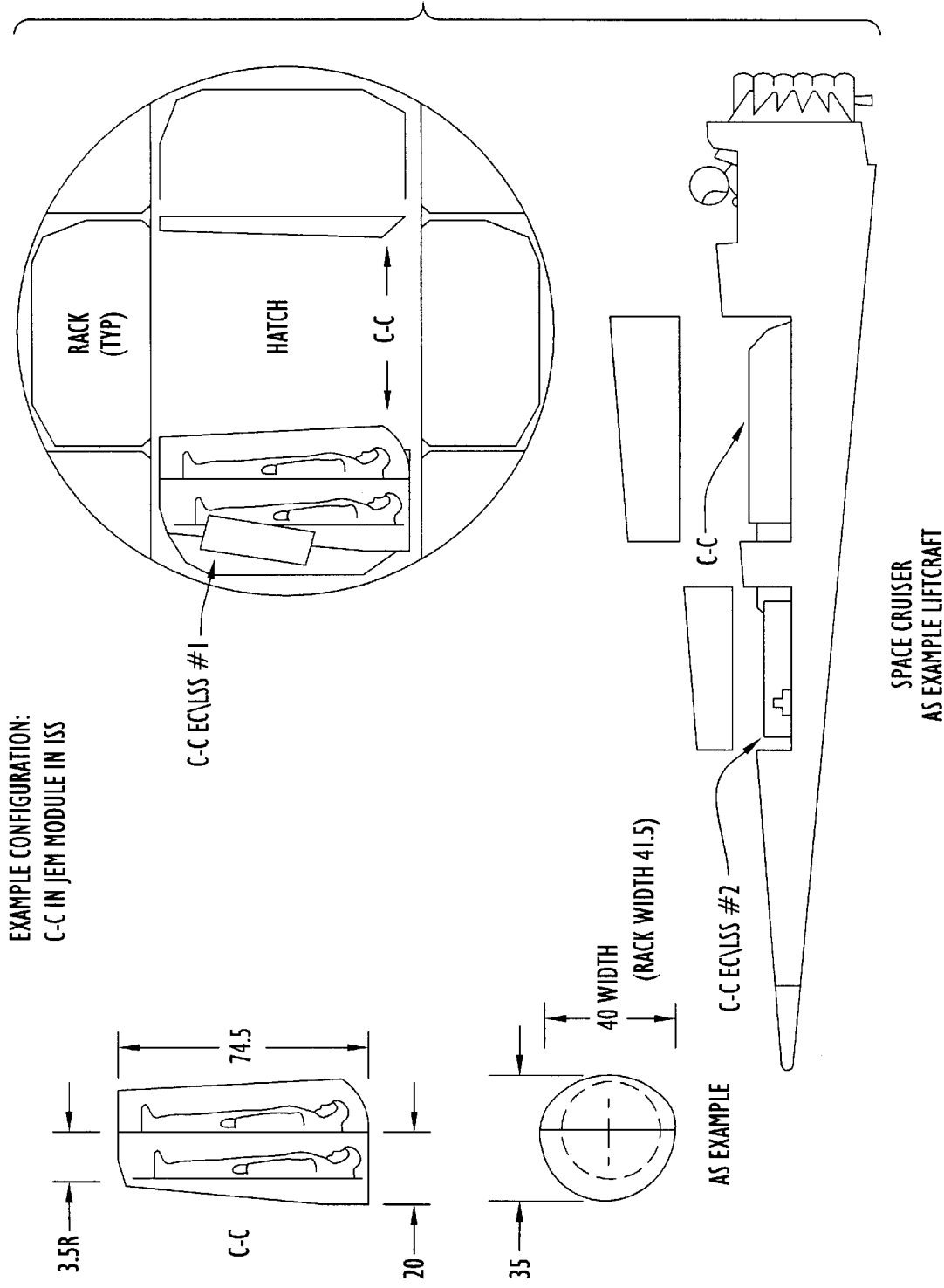
FIG. 15 is a diagram of the ALCV being used as a lifecraft implementing the Space Station Freedom's Japanese Experiment Module (JEM).

FIG. 15 titled "Example Configuration: C-C In JEM Module In Freedom", presents a Container-Cabin (C-C) for the Space Station Freedom's Japanese Experiment Module (JEM). It shows the Container-Cabin 35 as configured for the JEM and for transport in the Space Cruiser lifecraft that docks with the Space Station. A cross-section of the JEM is also provided in the Figure that shows the C-C installation and the capability to contain two astronauts in a shirt-sleeve environment. The standard racks are shown at all four sides or walls of the module's interior. The C-Cs 35 protrude into the corridor several inches in this example and are thus staggered down the corridor so that they can be rotted into the corridor at the same time if desired.

The name given to the invention for use herein for convenience and clarity is Container-Cabin 35 (C-C). The term "Container" connotes the analogy in function to containers used in ships, trucks, aircraft, etc. The term "Cabin" connotes the analogy to a cabin that houses people. The Container-Cabin 35 is a self-contained module that is readily ingressed and is capable of isolating and sustaining one or more astronauts during a period of abnormality or emergency with respect to the manner spacecraft that contains the Container-Cabin(s).

The C-C 35 is located within the manned spacecraft such as a space station, space laboratory or spaceplane. The C-C 35 is configured where practical to be easily moved from its pre-abnormality, normal position to other areas while containing one or more astronauts in a shirt-sleeve environment and condition. The C-C 35 is configured to enable a space vehicle to transport the inhabited C-C 35 in space and back to Earth.

The following overall Container-Cabin system description refers to the spacecraft carrying a Container-Cabin 35 as a Space Cruiser spaceplane, and alternatively to other vehicles without loss of generality intended with respect to the types and configuration of spacecraft or vehicles that can be used. It is recognized that the vehicular designs may be influenced by the integration of the Container-Cabin concept. The invention is not restricted to the number of astronauts per vehicle or the number of Container-Cabins used for explanation herein. In other words, C-Cs 35 can be configured for one, two or more persons and there can be one or more C-Cs 35, without implying any general restriction to two.

In more detail the concept is:

1. Modified Space Cruiser 14 or other crew return vehicle (s) capable of transporting one or more Container-Cabins (C-Cs) in space and/or to the earth are docked singly or distributively to the space station (SS) or other man-carrying spacecraft as "lifecraft" analogous to lifeboats. In the case of Space Cruisers 14 their aft sections are modified to carry a C-C 35 in which one or two persons can be carried in a shirtsleeve environment and returned to earth in as little as approximately thirty minutes. Other type space vehicles may transport the C-Cs 35 and may provide the means to house the C-Cs 35 in such a manner that the astronauts contained in the C-Cs can egress the C-C 35 safely while the vehicle is in space.

2. Each C-C 35 is placed, for example, in a standard-rack position in each SS module. Two C-Cs 35 per module could cover a module crew of four. C-Cs 35 can be added or subtracted from any SS module as the size of the module's crew is changed from time to time.

3. If an abnormality or emergency occurs up to two astronauts can open the closest C-C door and step inside. This takes seconds of time instead of the minutes required to don a space suit or to leave the module and move to another SS sanctuary such as an SS module or node or to a docked return vehicle. This very short time can for example allow the closing of the module hatch in the shortest possible time to isolate the module from the rest of the SS and thereby minimize the unwanted effects on the balance of the SS.

4. The C-C provides its own environment independent of the SS. This autonomous C-C Environment Control & Life Support System (CCEC/LSS) is for the most part attached externally to the back of the C-C 35. Typically when the C-C 35 is entered by an astronaut its CCEC/LSS becomes operative and controls the environment automatically, with manual control also available from within the C-C 35. SS power and other sources of supply for air etc. may be selected and used until the astronaut inhabitant(s) of the C-C switch to the autonomous CCE/LSS.

5. If the safety abnormality or problem lessens or disappears then the astronauts can open the C-C door and step out into the module. If the problem does not disappear, then a suited astronaut can come from another module or vehicle and, if possible, fix the problem. If the problem is not fixable in reasonable time, the suited astronaut can simply move the C-C 35 to another module where the C-C door can be opened safely by the contained astronauts or by an external crewmember.

6. There are various scenarios and modes of operation with the C-Cs 35 depending on the configuration of the SS. If necessary, the space-suited astronaut can move the C-C 35 to a crew return vehicle such as a Space Cruiser 14 and install it for space flight and/or recovery.

7. There is an EC/LSS unit stowed in the forward payload bay of the Cruiser that can be plugged into the C-C 35 as an alternative to the CCEC/LSS attached to the C-C 35. This feature provides redundancy and extends the duration of support. This stowed EC/LSS can be a version of the CCEC/LSS. The provision can be made for such a back-up EC/LSS with other type vehicles that are different from the Cruiser 14.

8. The Cruiser lifecraft or other crew return vehicle may stand off and return to the SS or can be flown back to earth with the C-C(s) 35.

9. The crew-return vehicle may be equipped to permit the opening of the C-Cs 35 within the vehicle.

10. A crew-return vehicle may be equipped to load and transport the C-Cs 35 without their being opened, at least until the vehicle is flying at an acceptable altitude for safe egress from the C-C.

11. Medical supplies for first-aid will be provided within the C-C 35.

12. The capability for individual and cooperative administration of medical assistance will be provided within the C-C 35.

13. Communication with, and where possible through, the SS (or other spacecraft within which the C-C 35 is placed) to external locations is provided.

14. Where practical and desired there is the option of the contained astronaut donning a special, emergency space suit while alone within a C-C 35. This permits an astronaut to egress a C-C 35 into a vacuum or otherwise contaminated environment. If two astronauts are within a C-C 35 both will don the protective gear before the C-C door is opened to allow one or both to egress. This is to prevent depressurization of the C-C 35 containing a non-suited astronaut.

15. Anti-claustrophobic measures are provided to minimize or avoid problems from claustrophobia.

16. The positions and attitude of the contained astronauts can be adjusted after ingress. This includes the option to rotate the astronauts to face each other or be front-to-back.

17. C-C Self-test and readiness instrumentation can be provided.

18. Beacons and enhanced radar cross-section are provided for enhancing the capability of the C-C 35 being located in space should the need obtain.

19. Suitable means for holding the astronauts will be provided. This includes seat and shoulder belts and boot straps for example.

20. Suitable shock mitigating means will be provided as required for safety during vehicular-induced shocks and other dynamics such as are caused by vehicular parachute deployment and disreefing.

21. The C-C 35 is configured to be fire-proof and resistant to other environmentally induced damage.

22. The C-C shell structure can be constructed to be flexible rather than stiff so that for example the C-C 35 can be compressed for ease of storage/stowing. Thus for example the C-C 35 can be stowed against a wall or other surface rather than inside a rack space. The C-C 35 can be quickly pressurized to expand it to its normal shape for occupancy.

What is claimed is:

1. A space cruiser, launchable from the earth's surface only by attachment to a separate powered launch vehicle and adapted for carrying at least one human occupant and comprising:

propulsion means carried by said space cruiser for propelling said space cruiser into and in outer space, said propulsion means being the exclusive propulsion means carried by said space cruiser and having insufficient power to launch said space cruiser into outer space from the earth's surface;

an enclosed cabin in at least a portion of said space cruiser;

means for establishing an isolated air and temperature conditioned environment in said cabin to permit said occupant to reside and breathe therein without the assistance of a spacesuit, oxygen mask and the like; and an outer shell of said space cruiser capable of withstanding thermal shock experienced during reentry into earth's atmosphere, said shell having an elongated wingless and generally conical configuration;

wherein said propulsion means includes an air-breathing propulsion module secured to said space cruiser and serving as a reusable initial stage thrust producer for said space cruiser when the space cruiser is launched from said launch vehicle within the earth's atmosphere, said module having a variable speed thrust capability.

2. The space cruiser of claim 1 wherein said outer shell has a forward end and an aft end, and wherein said generally conical configuration extends from the forward end to the aft end.

3. The space cruiser of claim 2 wherein said generally conical configuration is elliptical in transverse cross-section.

4. The space cruiser of claim 1 wherein said cabin has a generally circular transverse cross-section, thereby defining storage space between said shell and said cabin.

5. The space cruiser of claim 4 wherein said storage space contains fuel for said propulsion means.

6. The space cruiser of claim 1 further comprising means for securing said space cruiser in stored relationship on an orbiting spacecraft, and means for launching said space cruiser from said spacecraft.

7. The space cruiser of claim 1 further comprising means for securing said space cruiser to a conventional aircraft serving as said launch vehicle, and means for launching said space cruiser from said aircraft.

8. The space cruiser of claim 1 wherein said propulsion means further comprises rocket propulsion means for supplying thrust force to said space cruiser when outside earth's atmosphere.

9. The space cruiser of claim 1 further comprising parafoil means carried by said space cruiser for deployment upon re-entry of the space cruiser into the earth's atmosphere to facilitate landing of the space cruiser on the earth's surface.

10. A space cruiser adapted for carrying at least one human occupant to various locations in outer space and from the earth's atmosphere to outer space, said space cruiser comprising:

propulsion means carried by said space cruiser for propelling said space cruiser;

an enclosed cabin in at least a portion of said space cruiser;

means for establishing an isolated air and temperature conditioned environment in said cabin to permit said occupant to reside and breathe therein without the assistance of a spacesuit, oxygen mask and the like; and an outer shell of said space cruiser having a forward end and an aft end and capable of withstanding thermal shock experienced during reentry into earth's atmosphere, said shell having an elongated generally conical configuration extending from said forward end to said aft end, said generally conical confirmation having an elliptical transverse cross-section;

wherein said propulsion means includes an air-breathing propulsion module secured to said space cruiser and serving as a reusable initial stage thrust producer for said space cruiser when the space cruiser is launched from within the earth's atmosphere, said module having a variable speed thrust capability.

11. The space cruiser of claim 10 wherein said cabin has a generally circular transverse cross section, thereby defining storage space between said shell and said cabin.

12. The space cruiser of claim 11 wherein said storage space contains fuel for said propulsion means.

13. The space cruiser of claim 10 further comprising means for securing said space cruiser in stored relationship on an orbiting spacecraft, and means for launching said space cruiser from said spacecraft.

14. The space cruiser of claim 10 further comprising means for securing said space cruiser to a conventional aircraft serving as a launch vehicle, and means for launching said space cruise into outer space from said aircraft.

15. The space cruiser of claim 10 wherein said propulsion means further comprises rocket propulsion means for supplying thrust force to said space cruiser when outside earth's atmosphere.

16. The space cruiser of claim 10 further comprising parafoil means carried by said space cruiser for deployment upon re-entry of the space cruiser into the earth's atmosphere to facilitate landing of the space cruiser on the earth's surface.

* * * * *